United States Patent
Shim et al.

(10) Patent No.: US 10,103,765 B2
(45) Date of Patent: Oct. 16, 2018

(54) WATCH TYPE TERMINAL

(71) Applicant: LG ELECTRONICS INC., Seoul (KR)

(72) Inventors: Hongjo Shim, Seoul (KR); Mihyun Park, Seoul (KR); Hyunwoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/389,004

(22) Filed: Dec. 22, 2016

(65) Prior Publication Data

US 2017/0331505 A1 Nov. 16, 2017

(30) Foreign Application Priority Data

May 12, 2016 (KR) ........................ 10-2016-0058237

(51) Int. Cl.
*A61B 5/00* (2006.01)
*H04B 1/3827* (2015.01)
*A61B 5/05* (2006.01)

(52) U.S. Cl.
CPC ......... *H04B 1/385* (2013.01); *H04M 2201/42* (2013.01); *H04M 2203/256* (2013.01); *H04M 2250/12* (2013.01)

(58) Field of Classification Search
CPC .......... A61B 15/02438; A61B 15/6802; A61B 15/6887
USPC ........................................... 600/324
See application file for complete search history.

(56) References Cited

U.S. PATENT DOCUMENTS

2009/0054751 A1* 2/2009 Babashan ............ A61B 5/0002
600/324

FOREIGN PATENT DOCUMENTS

EP 2 955 593 A2 12/2015
EP 2 989 965 A2 3/2016
WO WO 2016/007548 A1 1/2016

* cited by examiner

*Primary Examiner* — Lee Nguyen
(74) *Attorney, Agent, or Firm* — Birch, Stewart, Kolasch & Birch, LLP

(57) ABSTRACT

A watch type terminal including a main body mountable on part of a user; at least one biometric sensor installed in the main body; and a controller configured to control the biometric sensor to detect a biometric signal of the user, determine target biometric data for the user to be collected based on the detected biometric signal, control the biometric sensor to detect additional biometric signals of the user to collect the target biometric data, and output the target biometric data to the user.

17 Claims, 33 Drawing Sheets

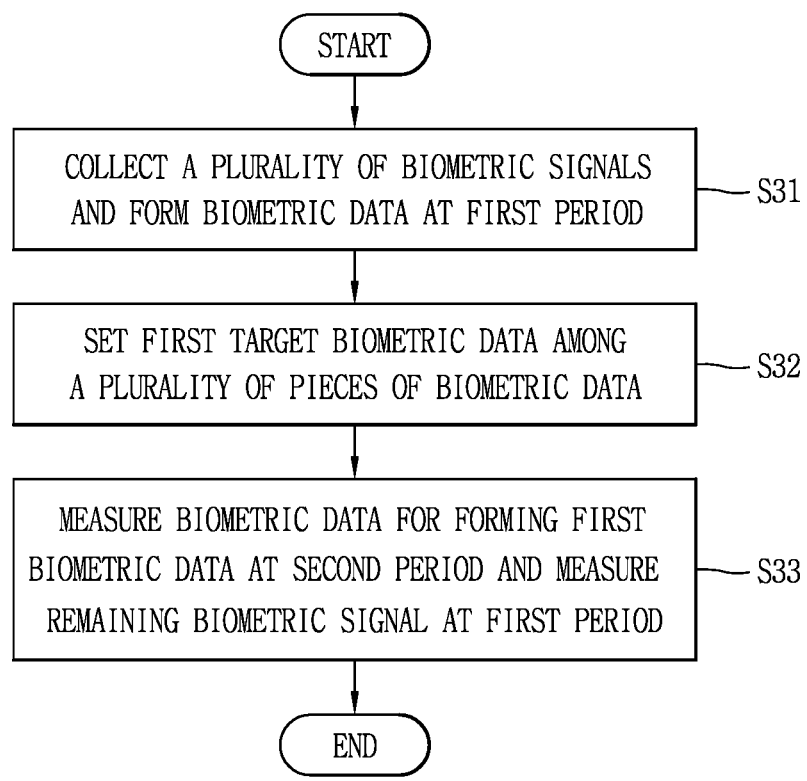

(a)

(b)

(a)

(b)

(c)

(d)

(e)

(f)

(g)

(a)　　　　　　　　　(b)

WATCH TYPE TERMINAL

CROSS-REFERENCE TO RELATED APPLICATIONS

Pursuant to 35 U.S.C. § 119(a), this application claims the benefit of earlier filing date and right of priority to Korean Application No. 10-2016-0058237, filed in Republic of Korea on May 12, 2016, the contents of which are incorporated by reference herein in their entirety.

BACKGROUND OF THE INVENTION

1. Field of the Invention

The present disclosure relates to mobile terminal having a sensing module for detecting a biometric signal.

2. Background of the Invention

A mobile terminal includes any device including a battery and a display unit, outputting information on the display unit using power supplied from a battery, and being configured to be portable by a user. A mobile terminal includes a device for recording and playing video and a device displaying a graphic user interface (GUI), and includes a notebook computer, a mobile phone, and glasses, clocks and game devices capable of displaying screen information.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device. Efforts are ongoing to support and increase the functionality of mobile terminals. Such efforts include software and hardware improvements, as well as changes and improvements in the structural components.

Recently, a function for collecting biometric information by a sensor, or the like, included in a mobile terminal has been studied. A mobile terminal can detect various biometric signals by modularizing or miniaturizing a sensor, but a user has to individually operate a sensor in order to receive a result regarding a desired biometric signal.

SUMMARY OF THE INVENTION

Therefore, an aspect of the detailed description is to provide a watch type terminal capable of selectively providing a desired type of biometric signal without a separate operation.

To achieve these and other advantages and in accordance with the purpose of this specification, as embodied and broadly described herein, a watch type terminal includes: a main body mountable on part of a human body; a detection unit including a biometric sensor module installed in the main body to detect a biometric signal; and a controller determining target biometric data to be collected based on the biometric signal detected by the detection unit and controlling the biometric sensor module to form the target biometric data.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 5A to 5C are conceptual views illustrating a control method of collecting target biometric data at different periods.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
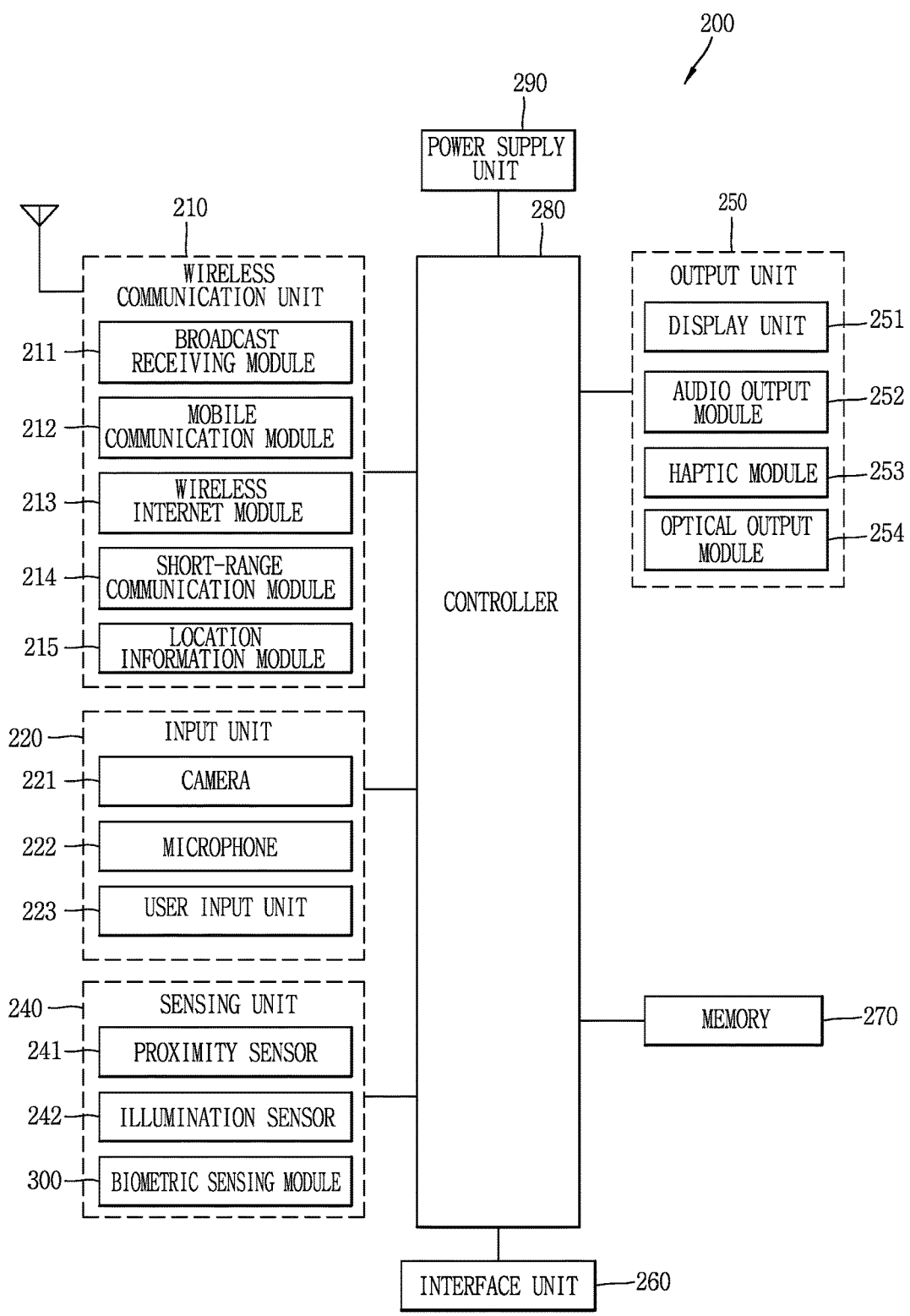
FIG. 1A is a block diagram illustrating a watch type terminal according to an embodiment of the present disclosure.
Figure 1B:
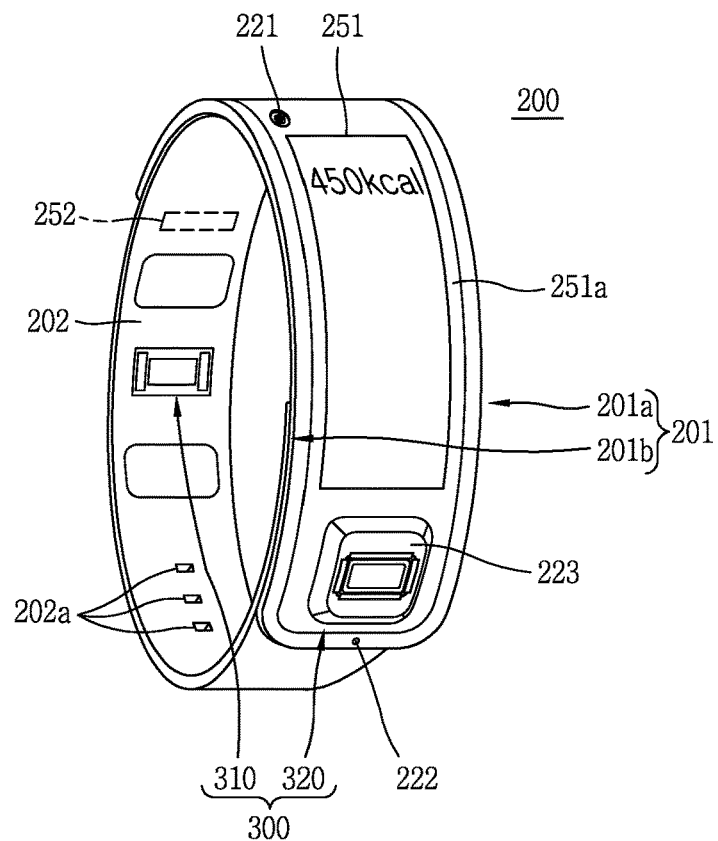
FIG. 1B is a conceptual view illustrating an example of a watch type terminal according to an embodiment of the present disclosure viewed from one direction.

FIG. 1A is a block diagram illustrating a watch type terminal according to an embodiment of the present disclosure, and FIG. 1B is a conceptual view illustrating an example of a watch type terminal according to an embodiment of the present disclosure viewed from one direction.

The watch type terminal 200 is shown having components such as a wireless communication unit 210, an input unit 220, a sensing unit 240, an output unit 250, an interface unit 260, a memory 270, a control unit 280, and a power supply unit 290. Implementing all of the illustrated components is not a requirement, and that greater or fewer components may alternatively be implemented.

The wireless communication unit 210 typically includes one or more modules which permit communications such as wireless communications between the watch type terminal 200 and a wireless communication system, communications between the watch type terminal 200 and another watch type terminal, communications between the watch type terminal 200 and an external server. The wireless communication unit 210 may include one or more modules connecting the watch type terminal 200 to one or more networks.

The wireless communication unit 210 includes one or more of a broadcast receiving module 211, a mobile communication module 212, a wireless Internet module 213, a short-range communication module 214, and a location information module 215.

The input unit 220 includes a camera 221 for obtaining images or video, a microphone 222, which is one type of audio input device for inputting an audio signal, and a user input unit 223 (for example, a touch key, a push key, and the like) for allowing a user to input information. Audio data or image data collected by the input unit 220 may be analyzed and processed as a control command of the user.

The sensing unit 240 is typically implemented using one or more sensors configured to sense internal information of the mobile terminal, the surrounding environment of the mobile terminal, user information, and the like. For example, in FIG. 1A, the sensing unit 240 is shown having a proximity sensor 241 and an illumination sensor 242. If desired, the sensing unit 240 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 221), a microphone 222, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The watch type terminal may be configured to utilize information obtained from sensing unit 240, and in particular, information obtained from one or more sensors of the sensing unit 240, and combinations thereof. A biometric sensing module 300 is also shown and will be discussed in more detail later.

The output unit 250 is typically configured to output various types of information, such as audio, video, tactile output, and the like. The output unit 250 is shown having a display unit 251, an audio output module 252, a haptic module 253, and an optical output module 254. The display unit 251 may have an inter-layered structure or an integrated structure with a touch sensor in order to facilitate a touch screen. The touch screen may provide an output interface between the watch type terminal 200 and a user, as well as function as the user input unit 223 which provides an input interface between the watch type terminal 200 and the user.

The interface unit 260 serves as an interface with various types of external devices that can be coupled to the watch type terminal 200. The interface unit 260, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the watch type terminal 200 can perform assorted control functions associated with a connected external device, in response to the external device being connected to the interface unit 260.

The memory 270 is typically implemented to store data to support various functions or features of the watch type terminal 200. For instance, the memory 170 may be configured to store application programs executed in the watch type terminal 100, data or instructions for operations of the watch type terminal 200, and the like. Some of these application programs may be downloaded from an external server via wireless communication. Other application programs may be installed within the watch type terminal 200 at time of manufacturing or shipping, which is typically the case for basic functions of the watch type terminal 200 (for example, receiving a call, placing a call, receiving a message, sending a message, and the like). It is common for application programs to be stored in the memory 270, installed in the watch type terminal 200, and executed by the control unit 280 to perform an operation (or function) for the watch type terminal 200.

The control unit 280 typically functions to control overall operation of the watch type terminal 200, in addition to the operations associated with the application programs. The control unit 280 may provide or process information or functions appropriate for a user by processing signals, data, information and the like, which are input or output by the various components depicted in FIG. 2A, or activating application programs stored in the memory 270. As one example, the control unit 280 controls some or all of the components illustrated in FIGS. 1A-1C according to the execution of an application program that have been stored in the memory 270.

In order to drive an application program stored in the memory 270, the controller 280 can control at least some of the components described above with reference to FIG. 1A. In addition, in order to drive the application program, the controller 280 can combine at least two of the components included in the watch type terminal 200 and operate the same.

The power supply unit 290 can be configured to receive external power or provide internal power in order to supply appropriate power required for operating elements and components included in the watch type terminal 200. The power supply unit 290 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 270.

Next, FIG. 1B is a perspective view illustrating one example of a watch type mobile terminal 200 in accordance with another embodiment. As illustrated in FIG. 1B, the watch type mobile terminal 200 includes a main body 201 with a display unit 251 and a band 202 connected to the main body 201 to be wearable on a wrist. In general, mobile terminal 200 can be configured to include features that are the same or similar to that of watch type terminal 200 of FIG. 1A.

The main body 201 includes a case having a certain appearance such as a first case 201a and a second case 201b cooperatively defining an inner space for accommodating various electronic components. Other configurations are also possible. For instance, a single case may alternatively be implemented, with such a case being configured to define the inner space, thereby implementing a mobile terminal 200 with a uni-body.

In addition, the watch type mobile terminal 200 can perform wireless communication, and an antenna for the wireless communication can be installed in the main body 201. The antenna may extend its function using the case. For example, a case including a conductive material can be electrically connected to the antenna to extend a ground area or a radiation area.

Further, the display unit 251 is shown located at the front side of the main body 201 so that displayed information is viewable to a user. In some embodiments, the display unit 251 includes a touch sensor so that the display unit can function as a touch screen. As illustrated, a window 251a is positioned on the first case 201a to form a front surface of the terminal body together with the first case 201a.

The illustrated embodiment includes an audio output module 252, a camera 221, a microphone 222, and a user input unit 223 positioned on the main body 201. When the display unit 251 is implemented as a touch screen, additional function keys may be minimized or eliminated. For example, when the touch screen is implemented, the user input unit 223 may be omitted.

The band 202 is commonly worn on the user's wrist and is made of a flexible material for facilitating wearing of the device. As one example, the band 202 may be made of fur, rubber, silicon, synthetic resin, or the like. The band 202 may also be configured to be detachable from the main body 201. Accordingly, the band 202 can be replaced with various types of bands according to a user's preference.

In one configuration, the band 202 may be used for extending the performance of the antenna. For example, the band may include therein a ground extending portion electrically connected to the antenna to extend a ground area. The band 202 may include fastener 202a such as a buckle type, a snap-fit hook structure, a Velcro® type, or the like, and include a flexible section or material. The drawing illustrates an example that the fastener 202a is implemented using a buckle.

The watch type terminal 200 according to an embodiment of the present disclosure includes first and second sensor modules 310 and 320. The first sensor module 310 is disposed on a surface of a band 202 in contact with a user's body when the watch type terminal 200 is worn, and the second sensor module 320 is formed on the other surface of the band 202. Using the first sensor module 310, the controller 280 can detect a biometric signal without a separate control command, while the user wears the watch type terminal 200.

The first and second sensor modules 310 and 320 may include a plurality of sensors such as a PPG sensor including a light receiving unit and a light emitting unit, and a plurality of electrodes. The first and second sensor modules 310 and 320 are also integrally formed with other components of the watch type terminal 200.

Figure 1C:
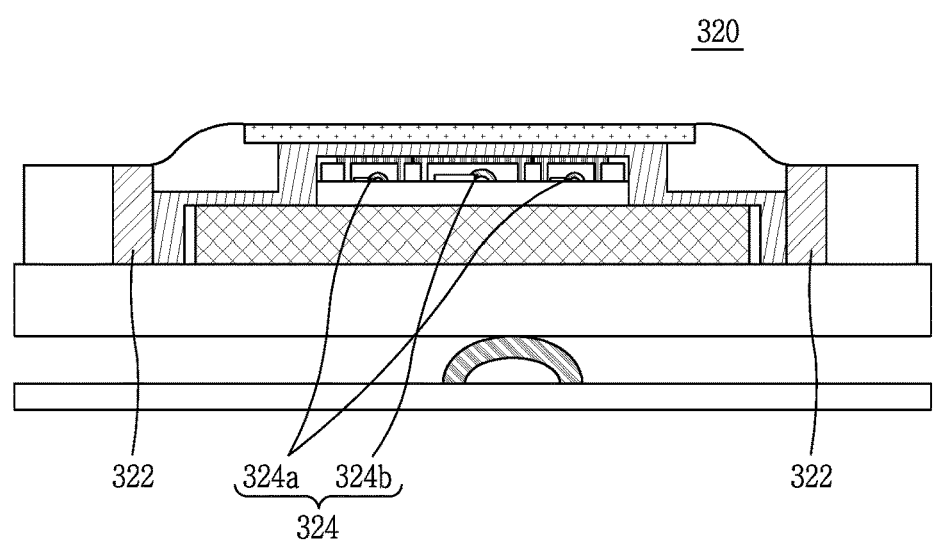
FIG. 1C is a partial cross-sectional view illustrating a configuration of a second sensor module according to an embodiment of the present disclosure.

Next, FIG. 1C is a partial cross-sectional view illustrating a configuration of the second sensor module 320 according to an embodiment of the present disclosure. As illustrated in FIG. 1C, the second sensor module 320 is integrally formed with a user input unit 223. The second sensor module 320 includes a PPG sensor 324 having a light emitting unit 324a and a light receiving unit 324b and an electrode unit 322 disposed to surround the PPG sensor 324 and exposed to the outside of the user input unit 223.

The PPG sensor 324 is disposed in a central region of the user input unit 223 and covered by a window. An actuator and a flexible circuit board are disposed below the PPG sensor 324, and when pressed, the actuator generates a control signal. While the user is applying a control command by the signal input unit, the controller 280 can collect a biometric signal generated as light emitted by the PPG sensor 324 is reflected by the user's finger, or collect a biometric signal generated as one region of the finger contacts the electrode unit 322.

The watch type terminal according to an embodiment of the present disclosure forms various types of biometric data using a sensor module including at least one sensor. In more detail, FIG. 1D is a conceptual view illustrating components of a sensor module forming various types of biometric data.

Figure 1D:
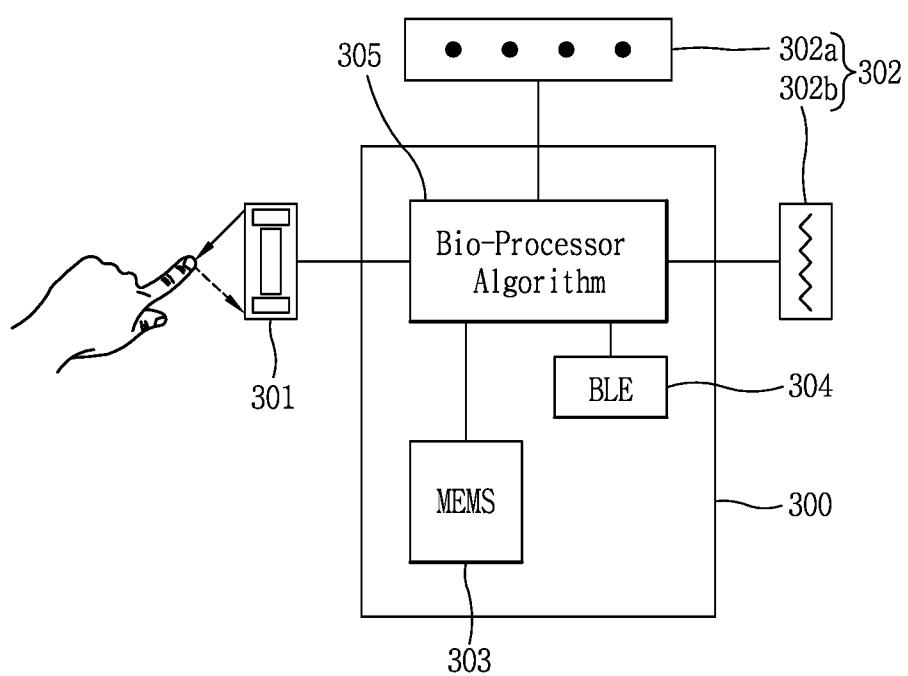
FIG. 1D is a conceptual view illustrating components of a sensor module forming various types of biometric data.

Referring to FIG. 1D, the sensor module 320 may include a PPG sensor 301, an electrode unit 302 including a skin electrode 302a and a skin temperature electrode 302b, an acceleration sensor, a BLE 304, and a control unit 305. The control unit (bio-processor executing an algorithm) 305 may be included in the controller 280. The control unit 305 forms a plurality of pieces of biometric data through a plurality of algorithms using a biometric signal collected through the PPG sensor 301 and the electrode unit 302. In addition, the sensor module 300 may further include a pressure sensor, an oxygen measurement sensor, a pressure sensor, and the like. These sensors may be configured as a single module, but the present disclosure is not limited thereto.

The control unit 305 may calculate data regarding a heart rate, a stress index, step count, a sleep state, body fat (impedance of human body), body temperature, blood pressure, and the like. For example, the control unit 305 can calculate blood pressure data of a user based on pressure information and light receiving information detected by the pressure sensor and the PPG sensor. That is, the control unit 305 can form blood pressure data, stress data, respiration data, as well as heart rate data, based on information of reflected light collected by the PPG sensor 301.

Further, the controller 280 can determine a volume of activity or a sleep state by the gyro sensor, or form data related to a quantity of exercise or a sleep pattern through a heartbeat, a skin temperature, and skin conductance. Also, the controller 280 can predict a balance of breath, a stress index, and cold symptoms through a heart rate. The controller 280 can predict a degree of perspiration, a degree of relaxation of body through the skin conductance, and determine a pattern of blood pressure and a symptom of an irregular pulse based on electrocardiogram (ECG) information or a heart rate. That is, the controller 280 can form biometric data representing a change in a body using sensors detecting different biometric signals. The controller 280 can control the biometric sensing module 300 to detect a desired biometric signal to form specific biometric data.

The controller 280 can form at least one biometric data by a combination of biometric information detected by selectively applying a plurality of algorithms, and may output guide information regarding a measurement request of a biometric signal required for applying an algorithm based on an output command of specific biometric data.

Figure 2A:
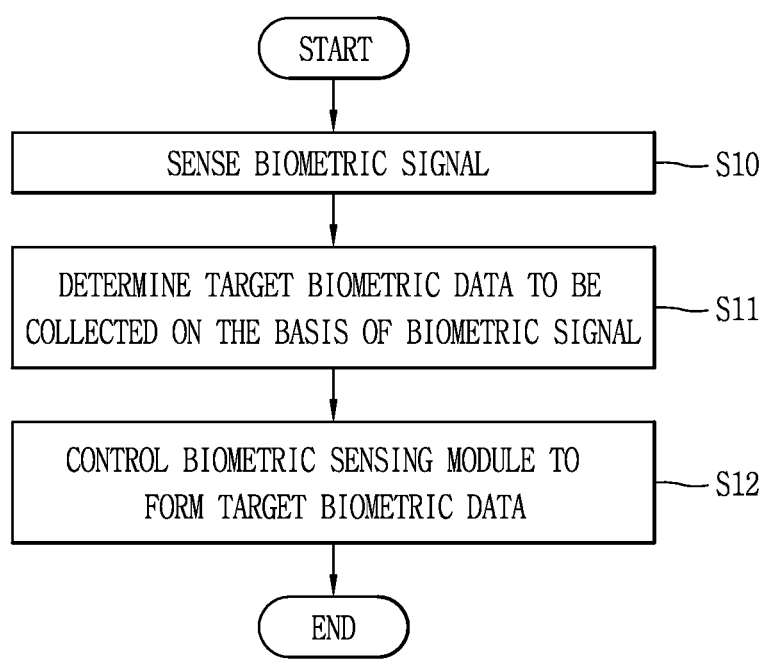
FIGS. 2A and 2B are conceptual views illustrating a control method of forming biometric data according to an embodiment of the present disclosure.
Figure 2B:
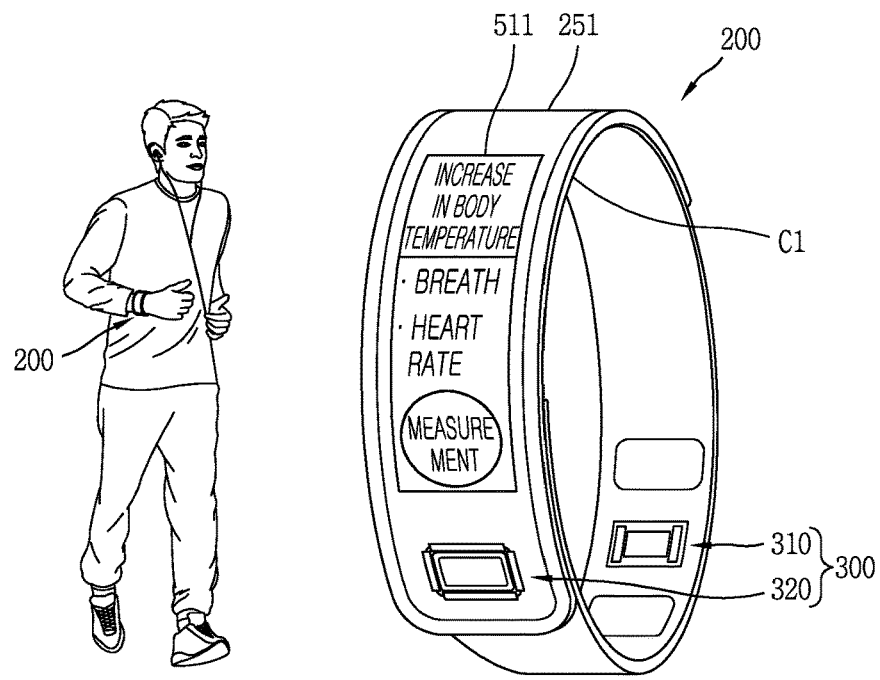
Figure 2B:
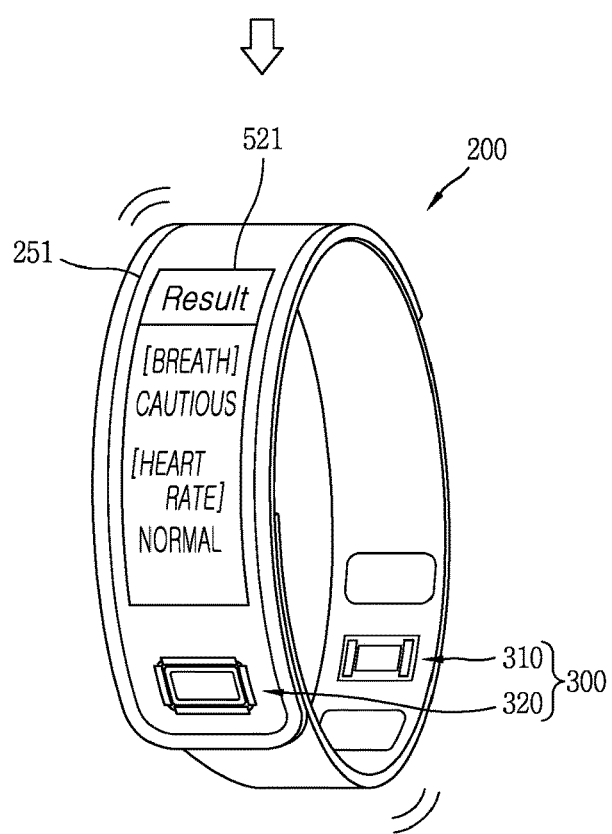

Next, FIGS. 2A and 2B are conceptual views illustrating a control method of forming biometric data according to an embodiment of the present disclosure. Referring to FIGS. 2A and 2B, the biometric sensor module 300 detects a biometric signal (S10). That is, the controller 280 controls the biometric sensor module 300 to detect at least one biometric signal. For example, the biometric sensor module 300 can be activated to detect one biometric signal C1 at a specific time interval or be controlled to detect a specific biometric signal when a specific event occurs.

The controller 280 determines target biometric data to be collected based on the detected biometric signal C1 (S11). For example, when the biometric signal C1 is a body temperature, and if the body temperature is not within a reference range or if a rapid change is detected, the controller 280 determines target biometric data in relation to the detected biometric signal (body temperature C1). For example, the target biometric data can be determined as respiration data and heartbeat data based on the detected body temperature.

When the target biometric data is determined, the controller 280 controls the biometric sensor module 300 in order to form the target biometric data (S12). In addition, the display unit 251 outputs a measurement screen 511 including the detected biometric signal C1 and the target biometric data index. Further, as shown in FIG. 2B, the display unit 251 can output or display an icon for applying a control command regarding whether to perform measurement on the measurement screen 511. Also, when the target biometric data is determined based on the biometric signal C1, the controller 280 can drive the biometric sensor module 300 for obtaining the target biometric data without outputting notification information indicating the determined target biometric data to the user.

The controller 280 forms the target biometric data by applying a specific algorithm based on at least one biometric signal obtained by the biometric sensor module 300. The display unit 251 then outputs a result screen 521 including the formed target biometric data. The result screen 521 can include information related to the detected biometric signal or include information related to a physical condition of the user based on the biometric signal.

According to the present embodiment, the target biometric data required for the user is determined based on the detected biometric signal of the user, and the user can be provided with specific information in accordance with a change in the user's body, even without applying a separate control command. Also, since the target biometric data is formed selectively using the detected biometric signal, an additional sensor is not required.

Figure 3A:
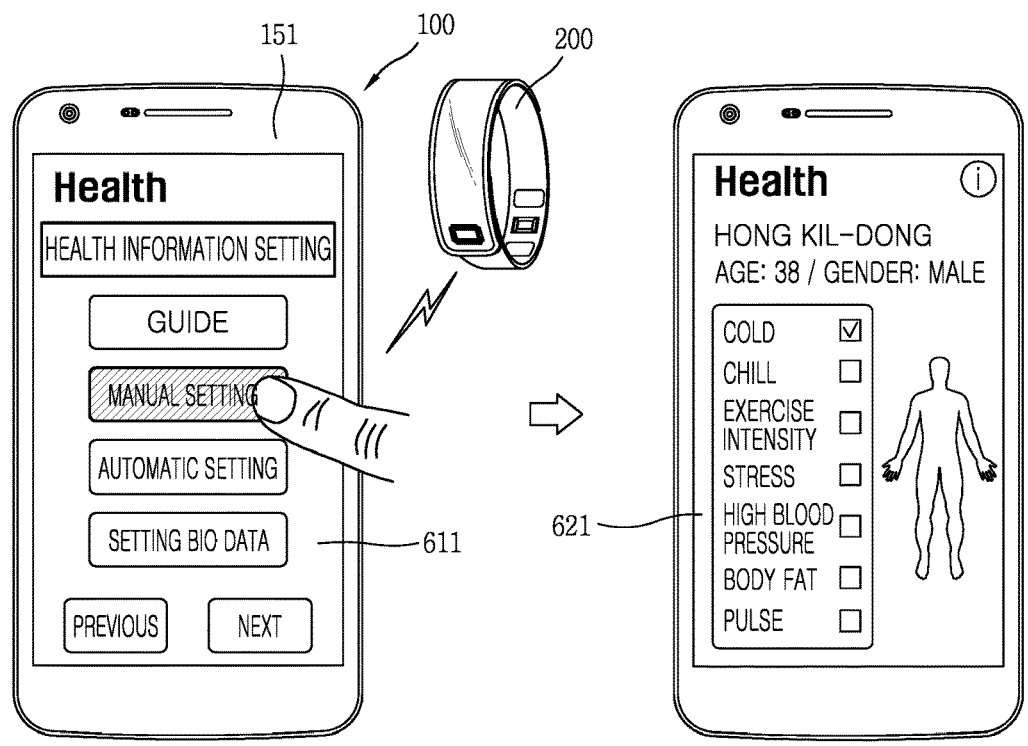
FIGS. 3A to 3C are conceptual views illustrating a control method of a watch type terminal according to an embodiment of the present disclosure.
Figure 3A:
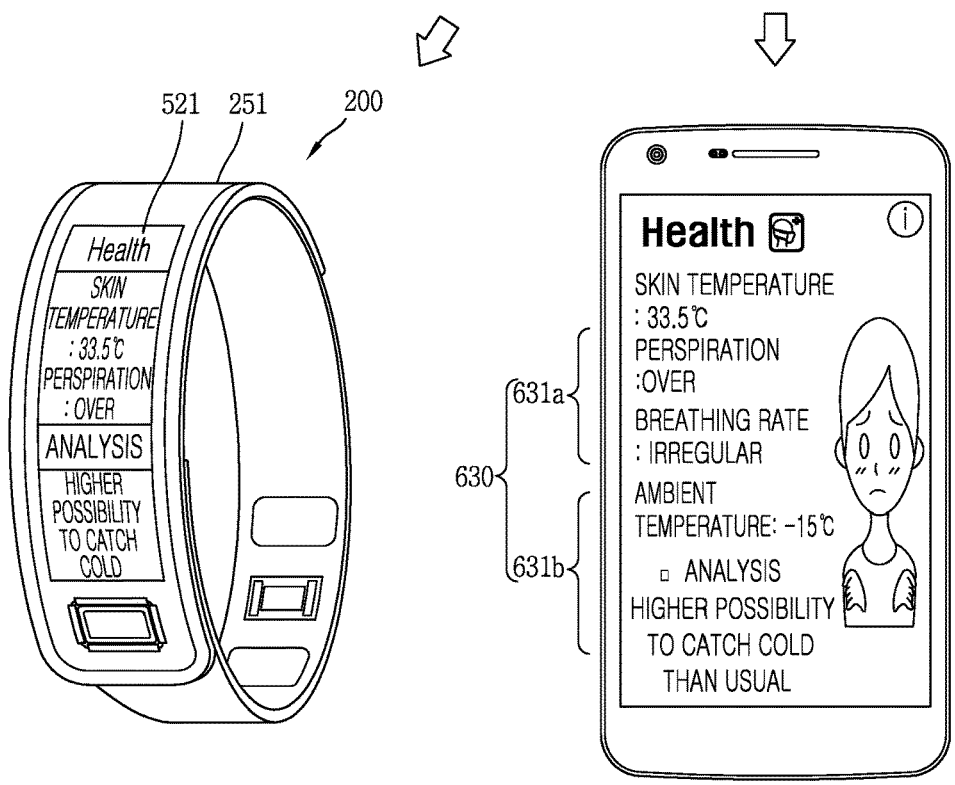
Figure 3B:
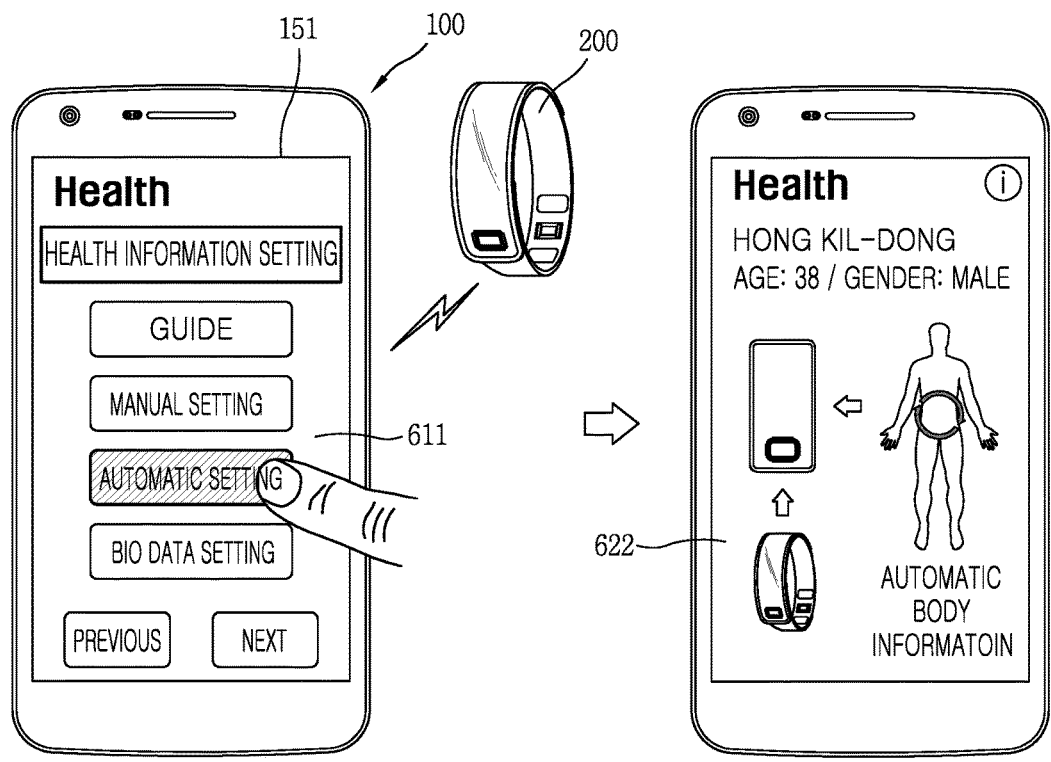
Figure 3C:
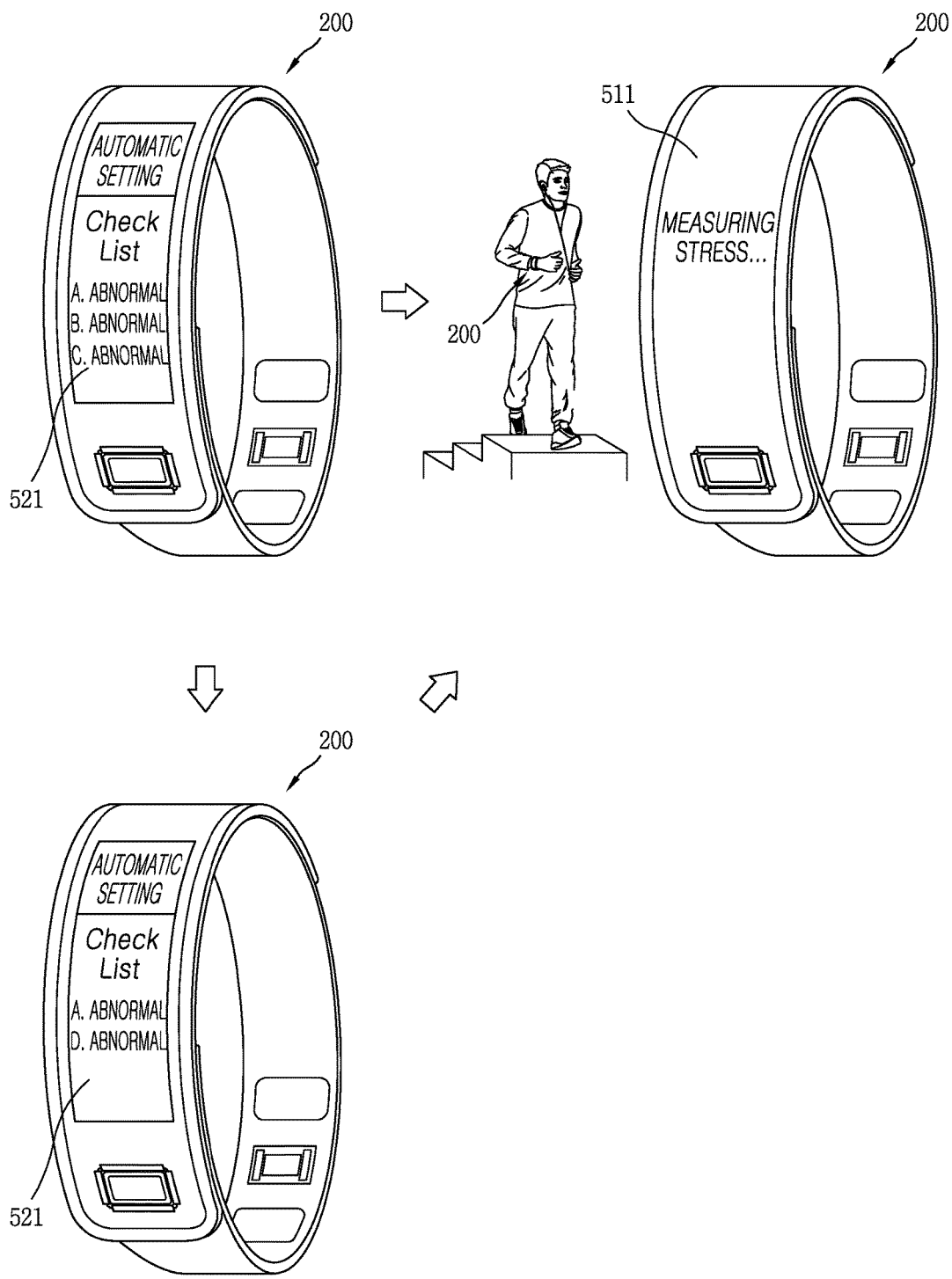

Next, FIGS. 3A to 3C are conceptual views illustrating a control method of a watch type terminal 200 according to an embodiment of the present disclosure. The watch type terminal 200 according to the present embodiment can interwork with an external device 100. The external device 100 can transfer configuration information for providing the target biometric data to the watch type terminal 200. The external device 100 can be a mobile phone, a smartphone, a laptop computer, a digital broadcasting terminal, a personal digital assistant (PDA), a portable multimedia player (PMP), a navigation device, a slate PC, a tablet PC, an ultrabook, a wearable device (e.g., a smartwatch, a smart glass, a head mounted display (HMD), and the like.

A display unit 151 of the external device 100 performing wireless communication with the watch type terminal 200 outputs a first configuration screen 611 for setting a determination mode of the target biometric data, in which one of manual setting, automatic setting, and bio data setting may be selected. As shown, the first setting screen 611 includes at least one graphic image for selecting a determination mode of the target biometric data.

However, the watch type terminal 200 can also execute a determination mode of the target biometric data by itself, rather than interworking with the external device 100. That is, the display unit of the watch type terminal 200 can output the first setting screen.

A control method of providing the target biometric data when the manual setting mode is selected will be described with reference to FIG. 3A. When the manual setting mode is set by the external device 100, the display unit 151 outputs a manual setting screen 621. The manual setting screen 621 includes a particular body issue list. For example, the body particular issue list includes cold, chill, exercise intensity, stress, high blood pressure, body fat, pulsation, and the like. The user can then select a particular body issue applied to a current body issue.

Further, the controller 280 can determine target biometric data corresponding to the selected particular body issue, and the memory 270 can store at least one target biometric data matched to each particular body issue. The particular body issue and the at least one target biometric data can be formed by stored data or can be set by the user. Further, the target biometric data can be set based on history information of the user detected by the biometric sensing module 300. The watch type terminal 200 receives information related to the particular body issue or information regarding the target biometric data through the external device 100.

When a particular body issue is selected by the manual setting screen 621, the controller 280 determines target biometric data to be formed, and drives the biometric sensing module 300. The biometric sensing module 300 may include a plurality of sensing modules detecting a plurality of biometric signals.

In addition, the controller 280 controls the biometric sensing module 300 to collect a biometric signal required for forming the target biometric data, and forms the target biometric data using an algorithm for forming the target biometric data and the collected biometric signal. When the target biometric data is formed, the controller 280 provides the target biometric data by the output unit 250. For example, the display unit 251 can output a result screen 521 including the target biometric data or the audio output unit 252 can output notification information In addition, the controller 280 controls the wireless communication unit 210 to transmit the target biometric data to the external device 100. Accordingly, the display unit 151 outputs a result screen 630 including biometric data 631a and health guide information 631b analyzed based on the biometric data 631a. While transmitting the target biometric data to the external device 100, the controller 280 can output notification information through the output unit 250.

According to the present embodiment, the user can determine a current condition by himself or herself and select health information requiring attention, and thus the user can be provided with calculated target biometric data even without using an additional sensor.

A control method when determination of target biometric data is selected by an automatic setting mode will be described with reference to FIGS. 3B and 3C. The automatic setting mode can be selected through the setting screen 611 output on the display unit 151 of the external device 100. The controller 280 receives a control command regarding automatic setting selected from the external device 100.

Referring to FIG. 3C, the controller 280 controls the biometric sensing module 300 to collect a plurality of biometric signals based on the control command. The controller 280 forms a plurality of pieces of biometric data using a detected biometric signal. While the plurality of pieces of biometric data are being formed, the display unit 151 of the external device 100 can output the automatic setting screen 622, but the present disclosure is not limited thereto.

The display unit 251 can output result information 521 including biometric data formed based on the biometric signal. The result information 521 may include evaluation information for determining the target biometric data. The controller 280 can compare the formed biometric data with previously stored reference data and determine whether the biometric data is within a normal range. The result information 521 may include only an item of the biometric data which is not within the normal range.

In addition, while the display unit 251 is outputting the result information 521, the controller 280 can select target biometric data based on a touch applied to the display unit. Further, the controller 280 can form all the biometric data included in the result information 521 as the target biometric data. When the target biometric data is determined, the controller 280 forms the target biometric data based on a biometric signal detected by the biometric sensing module 300.

In addition, the controller 280 can form a plurality of pieces of biometric data based on a preset period and determine biometric data changed from a normal range to an abnormal range, as target biometric data. Thus, a type of the target biometric data can be changed.

According to the present embodiment, since the target biometric data is determined according to a biometric signal of the user and a change of the biometric signal, the user does not need to select biometric data required for a body condition. Also, set biometric data can be calculated without the necessity of individually controlling sensors installed in the watch type terminal.

Figure 4A:
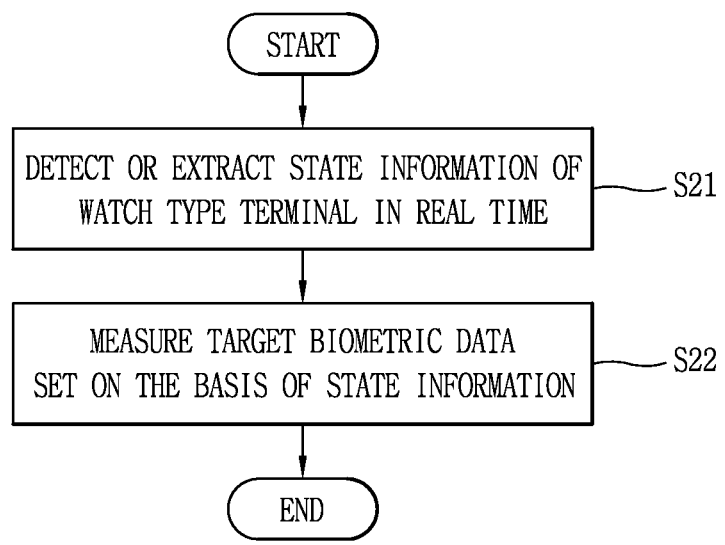
FIGS. 4A and 4B are conceptual views illustrating a control method of determining target biometric data using collected bio data.
Figure 4B:
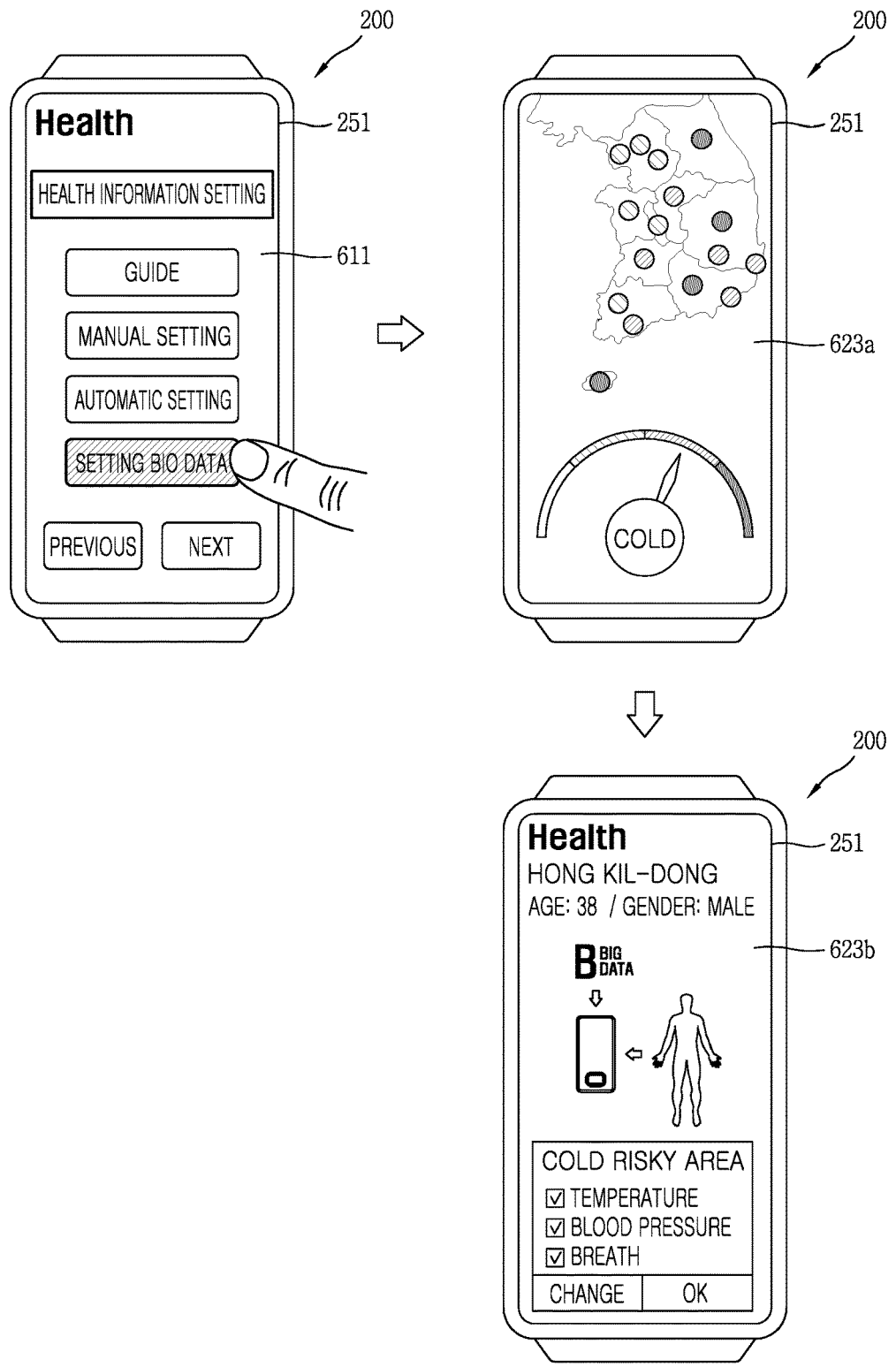

Next, FIGS. 4A and 4B are conceptual views illustrating a control method of determining target biometric data using collected bio data. Referring to FIGS. 4A and 4B, the controller 280 detects state information of the watch type terminal 200 in real time or extracts state information of the watch type terminal 200 stored in the memory 170 (S21). The state information may be a current date, time, a position, weather information, received specific news information, information of an application used by the user, search information of the user, log information of the watch type terminal 200, and the like.

The display unit 251 outputs a setting screen 611. When setting of bio data is selected by the setting screen 611, current state information of the watch type terminal 200 is collected or state information stored in the memory 270 is extracted. While the state information is being detected or extracted, the display unit 251 can output state information 623a related thereto. As illustrated in the drawing, the state information 632a may include weather information of an area where the watch type terminal 200 is located and warning information related to weather. The weather information and the warning information can be received from a specific server through a wireless communication unit.

The controller 280 sets the target biometric data based on the state information 623a (S22). For example, when information related to cold is included in the state information 623a, a biometric indicator (e.g., body temperature, blood pressure, respiration, and the like) for determining whether the user has a cold is set as target biometric data.

When the target biometric data is determined, the controller 280 controls the display unit 251 to output a measurement standby screen 623b. At least one target biometric data list is displayed on the measurement standby screen 623b, and the target biometric data can be deleted or added based on a user's control command.

According to the present embodiment, biometric data required for the user can be determined using current state information and data that may affect the user's health, as well as biometric information of the user. Thus, a change in the user's body can be detected from a change in an external environment and it is not required to continuously measure a change in the user's body.

In addition, a control method related to the manual setting, automatic setting, and bio data setting may also be used together. For example, biometric data set using the bio data can be collected and only an indicator not within a normal category, among the biometric data, can be selectively set as target biometric data. Thus, more appropriate biometric data can be provided to the user.

Figure 5B:
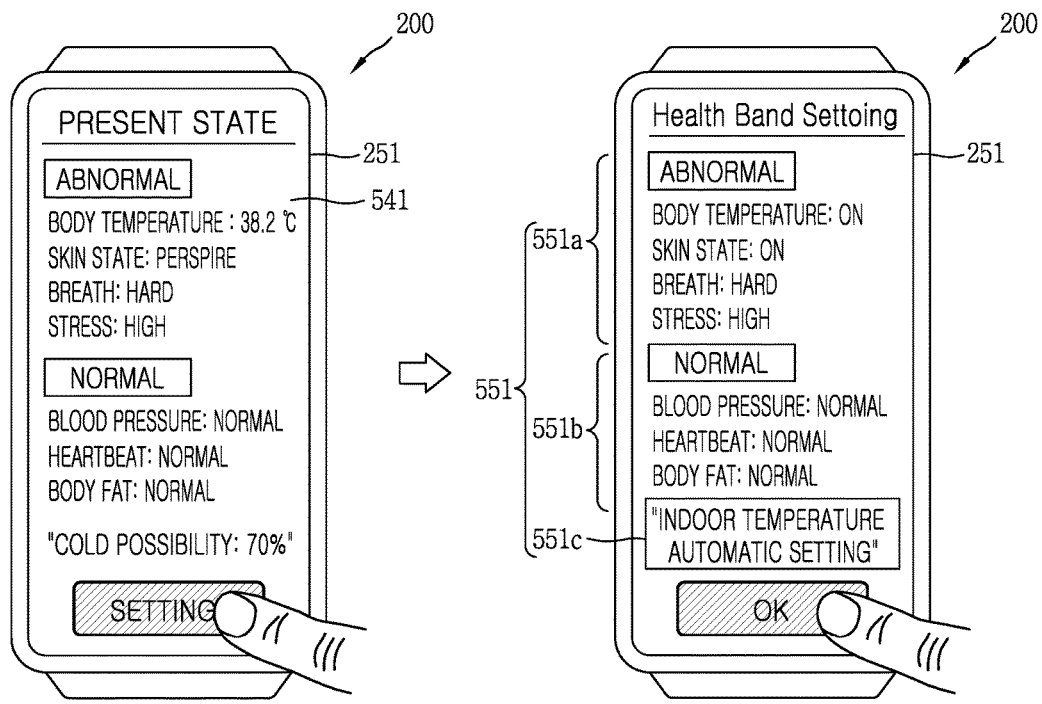
Figure 5C:
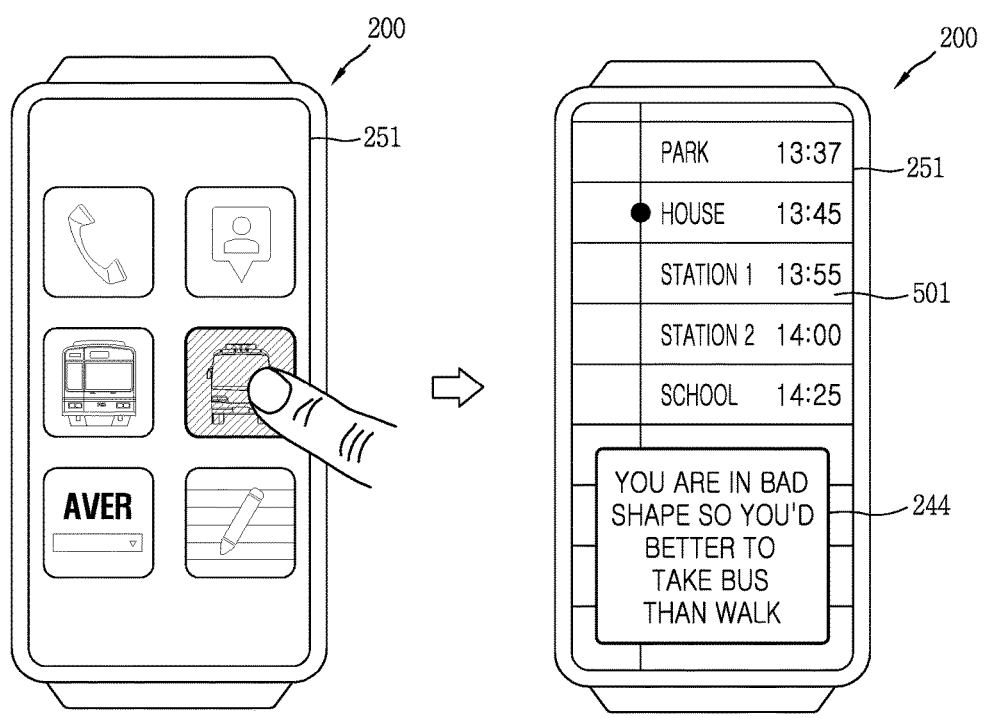

Next, FIGS. 5A to 5C are conceptual views illustrating a control method of collecting target biometric data at different periods. The controller 280 collects a plurality of pieces of biometric information at a first period (S31). For example, the controller 280 controls the biometric sensing module 300 to collect biometric information at time when the user gets up. The biometric information may be set by the user or may correspond to a plurality of pieces of biometric information that is measured by the biometric sensing module 300. For example, the biometric information includes a body temperature, a condition of a skin, respiration, a stress index, and the like.

When the biometric signal is detected, the controller 280 controls the display unit 251 to output result information 541 including biometric data formed by the biometric signal. The result information 541 may include analysis information based on the biometric data. When the biometric data is formed, the controller 280 can determine whether the biometric data is within a normal category based on previously stored reference information.

The controller 280 determines target biometric data based on the result information 541 (S32). The target biometric data may be set based on information regarding the detected biometric signal and an external environment. When a control command for setting formation of the biometric data is applied while the result information 541 is being output, the display unit outputs a setting screen 551.

The setting screen 551 can display the plurality of pieces of biometric data such that they are differentiated as normal condition information 551a and abnormal condition 551b. In this instance, the controller 280 can set biometric data related to the abnormal condition 551b as target biometric data.

Based on a control command applied while the result information 541 is being output, the controller 280 controls the biometric sensing module 300 to measure a biometric signal related to the biometric data at a second period and the other remaining biometric signal at a first period (S33). The second period is set to be shorter than the first period, and thus, the biometric sensing module 300 can frequently detect a biometric signal for forming the target biometric data. In addition, the controller 280 can add or change the target biometric data by a biometric signal detected at the second period, while forming the target biometric data.

FIG. 5C illustrates a specific application being executed by the user after the third analysis screen 543 is output (e.g., when an icon for executing an application is selected after the third analysis screen 543 is output). The controller 280 outputs an execution screen 501 of an application based on a touch applied to the icon and can control the display unit 251 to output a guide window 244 related to the execution screen 501.

The guide window 244 includes warning information corresponding to a component of the application included in the execution screen 501. For example, when the application is a path guide application, the guide window 244 may include information regarding a different path based on the biometric data.

Further, the controller 280 can include guide info nation proposing termination of execution of the application or recommending use of the application for a short time. According to the present embodiment, when biometric data is formed, execution of an application is limited or different driving of an application is proposed.

Figure 6A:
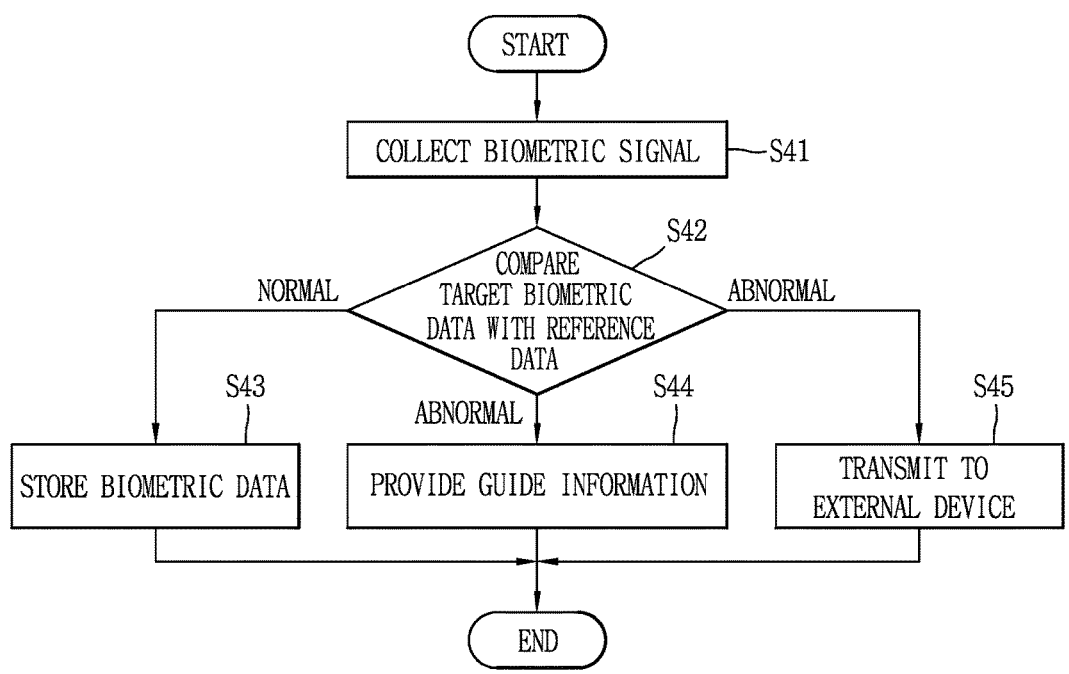
FIGS. 6A to 6C are conceptual views illustrating a control method of outputting guide information based on collected target biometric data.
Figure 6B:
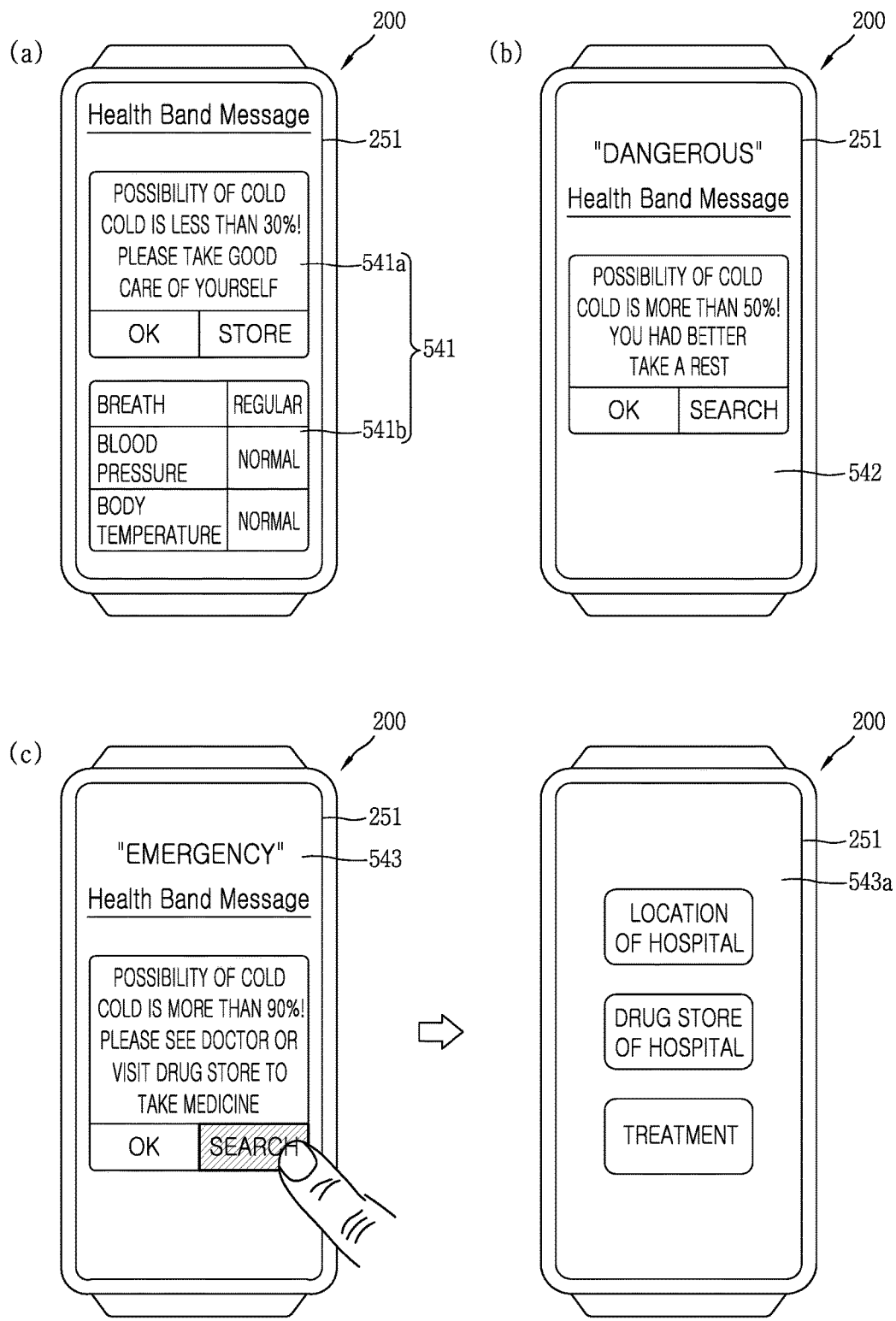

Next, FIGS. 6A and 6B are conceptual views illustrating a control method of outputting guide information based on collected target biometric data. The biometric sensing module 300 collects the biometric signal (S41). The controller 280 forms the target biometric data using the biometric signal and compares the target biometric data with reference data (S42).

Upon comparing the target biometric data with the reference data, the controller 280 determines whether the target biometric data is within a normal range to classify the target biometric data as abnormal or normal. When the biometric data is within a normal range based on the reference data, the controller 280 controls the memory 270 to store the biometric data. In addition, when the biometric data corresponds to an abnormal range based on the reference data, the controller 280 provides guide information (S44) or transmits the biometric data to an external device (S45).

Referring to (a) of FIG. 6B, when the biometric data is formed, a first analysis screen 541 is output. The first analysis screen 541 may include health guide information corresponding to the biometric data. When it is determined that a body condition is within a normal range through comprehensive analysis of the biometric data (for example, when a majority of the plurality of pieces of biometric data is within the normal range), the controller 280 controls the display unit 251 to output a first analysis screen 541. The first analysis screen 541 may include a notification window 541a and analysis detail information 541b. The notification window 541a may include a warning message related to the biometric data. The notification window 541a may be output in the form of a pop-up window when the reference data is formed.

The first analysis screen 541 includes information indicating whether the plurality of pieces of biometric data are within the normal range. Accordingly, the user can recognize his or her physical condition through the different types of biometric data.

Referring to (b) of FIG. 6B, the controller 280 compares at least one biometric data with the reference data, and when the physical condition of the user is determined as a "dangerous" condition, the controller 280 controls the display unit to output a second analysis screen 542. The second analysis screen 542 may include a message corresponding to the "dangerous" condition, and the message may be output in the form of a pop-up window. The controller 280 can control the display unit to output specific information of the biometric data based on a touch applied to the second analysis screen 542.

Referring to (c) of FIG. 6B, when the physical condition of the user is determined to be an "emergency" condition compared with the biometric data, the controller 280 controls the display unit 251 to output a third analysis screen 543. The third analysis screen 543 outputs a message corresponding to the "emergency" condition. When the formed biometric data exceeds "emergency" reference range, the controller 280 can determine the physical condition of the user as "emergency."

The message may include behavior guide information for the physical condition of the user. The controller 280 can output first guide information 543a related to the behavior guide information based on a touch applied to the third analysis screen 543. For example, the guide information may include information regarding a location of a hospital or a drugstore corresponding to the case of a general abnormal physical condition and treatment guide information corresponding to the biometric data.

According to the present embodiment, since the physical condition of the user is provided by stages through the formed biometric data, the user does not need to perform additional measurement or measure a biometric signal on purpose according to the physical condition. Also, since the additional guide information is provided according to the physical condition, the user can rapidly take measures on the physical condition.

Figure 6C:
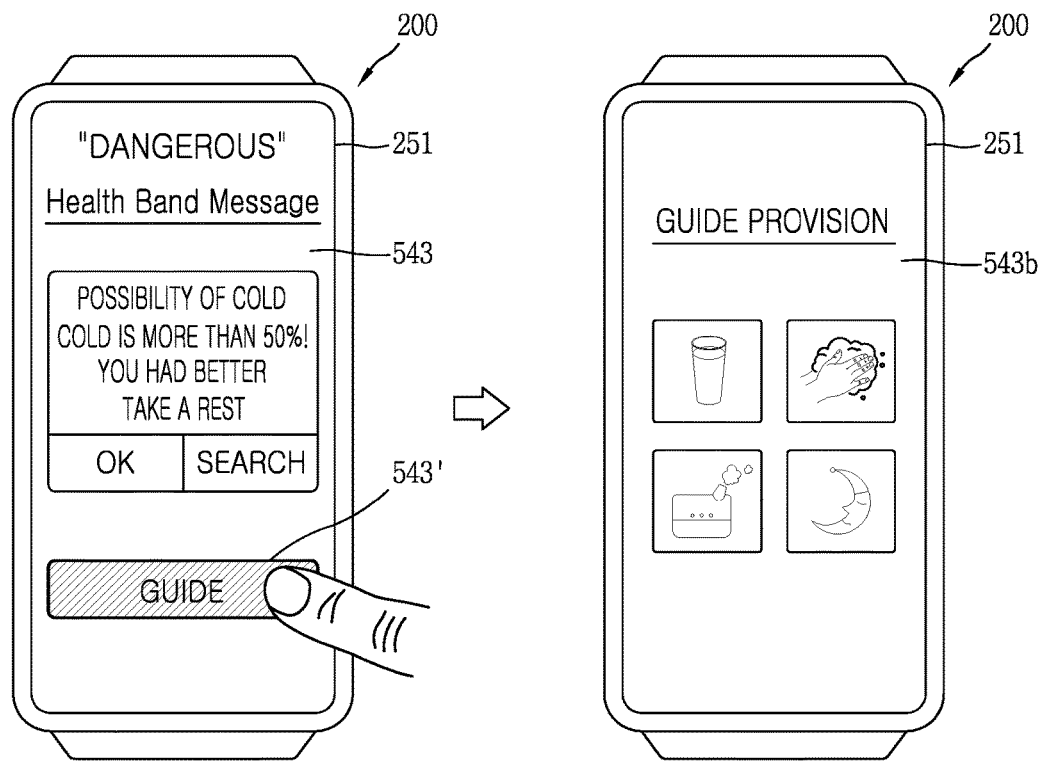

Next, FIG. 6C is a conceptual view illustrating a control method of providing guide information according to another embodiment. Referring to FIG. 6C, the third analysis screen 543 is output when the physical condition of the user is determined as a "dangerous" condition based on the biometric data, and the third analysis screen 543 includes a graphic image 543' receiving a touch input to provide guide information.

Based on a touch input applied to the graphic image 543', the controller outputs second guide information 543b. The second guide information 543b may include a plurality of graphic images or text classified into a plurality of categories. The graphic images or text may receive a touch input in order to output specific information.

Figure 7A:
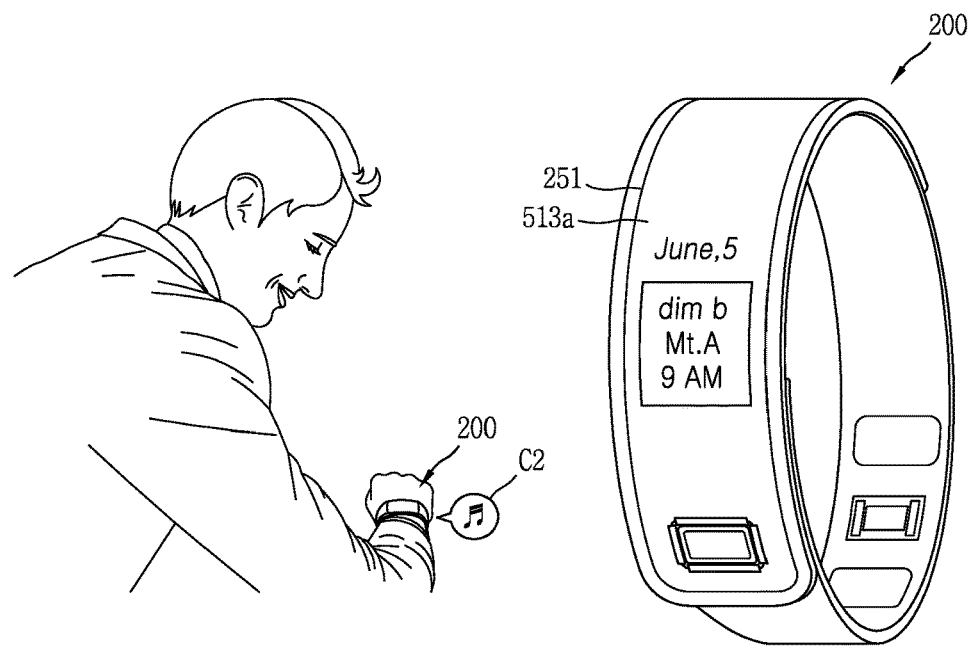
FIGS. 7A and 7B are conceptual views illustrating a control method of forming biometric data based on an event that occurs according to another embodiment of the present disclosure.
Figure 7A:
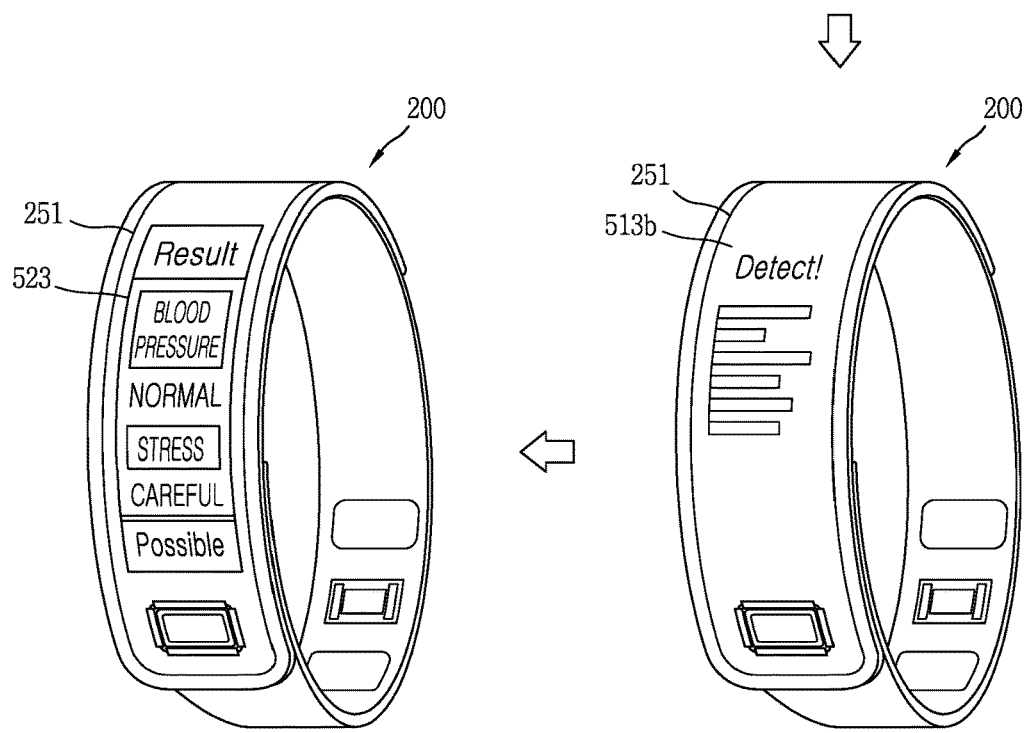
Figure 7B:
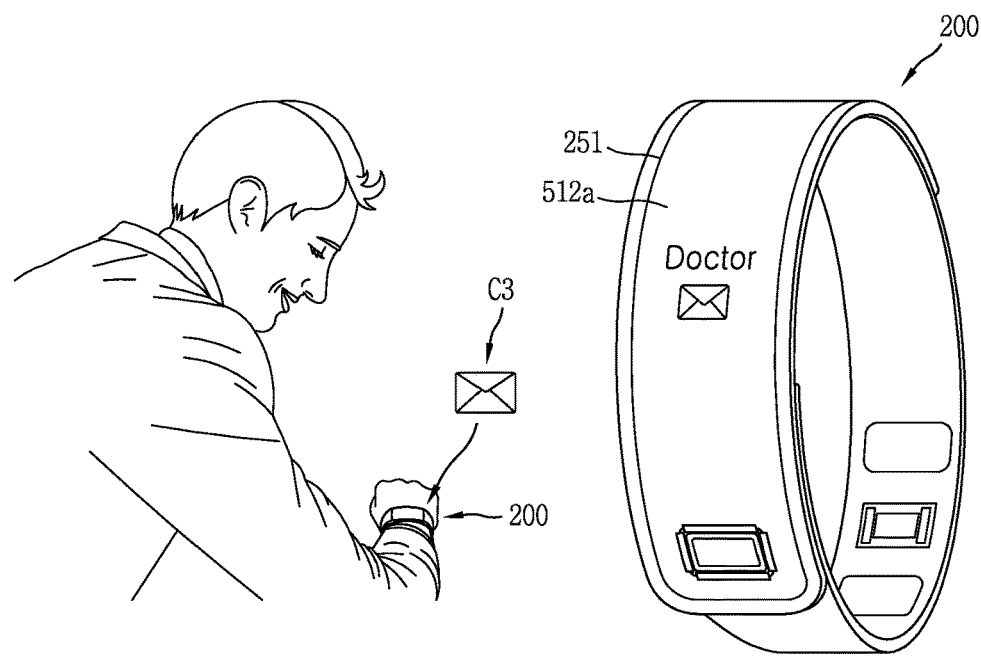
Figure 7B:
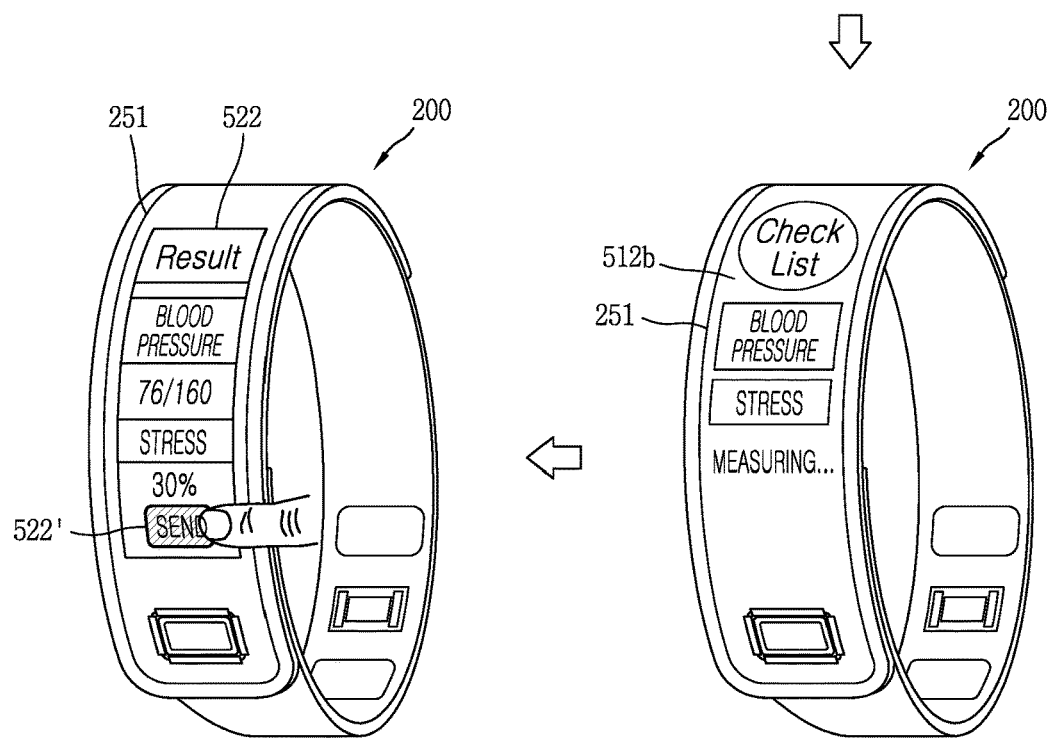

FIGS. 7A and 7B are conceptual views illustrating a control method of forming biometric data based on an event that occurs according to another embodiment of the present disclosure. Referring to FIG. 7A, when notification of a previously stored first event C2 takes place, the controller 280 controls the biometric sensing module 300 to form biometric data related to the first event C2. For example, the first event may correspond to notification of schedule information stored by the user. The controller 280 can control the display unit to output a first notification screen 513a based on the first event C2.

The controller forms biometric data corresponding to the first even tC2. For example, a type of the biometric data may be determined based on information included in the first event C2, or a type of biometric data to be formed by the user when the schedule information is stored may be determined. For example, when the schedule information includes destination (location) information, biometric data for recognizing whether the user is in a state in which he or she can move or become active in the destination (whether the user cancan climb mountain).

After the first notification screen 513a is output, the controller 280 controls the biometric sensing module 300 to detect at least one biometric signal and controls the display unit to output a measurement notification screen 513b. When at least one biometric data corresponding to the first event C2 is measured, the controller 280 controls the display unit to output a result screen 523. Also, the result screen 523 may include analysis information regarding whether the user is in a physical condition in which the user is available to follow the previously stored schedule.

Referring to FIG. 7B, when a second event C3 occurs, the controller 280 forms biometric data corresponding to the second event C3. The second event C3 may correspond to a wireless signal (e.g., a message, or the like) received through the wireless communication unit 210. When the second event C3 occurs, the controller 280 controls the display unit to output a second notification screen 512a. When the second event C2 is reception of a message, the notification screen 512a may include a notification image indicating reception of the message.

When the second event C3 occurs, the controller 280 controls the display unit 251 to output a measurement notification screen 512b. The controller 280 can determine target biometric data to be formed using measurement information included in the second event C3. That is, the received message may include information regarding target biometric data.

When the target biometric data is formed, the controller 280 controls the display unit to output a result screen 522. The result screen 522 may include a graphic image 522' for forming a control command to perform a function related to the second event C2. For example, when a touch is applied to the graphic image 522', a function of providing measurement result information including the result screen 522 to an external device may be performed.

According to the present embodiment, when a specific event occurs, required biometric data is formed coopera- tively, and a specific function may be performed by utilizing the biometric data, whereby the user can perform a function of measuring and using biometric data without a separate control command.

Figure 8A:
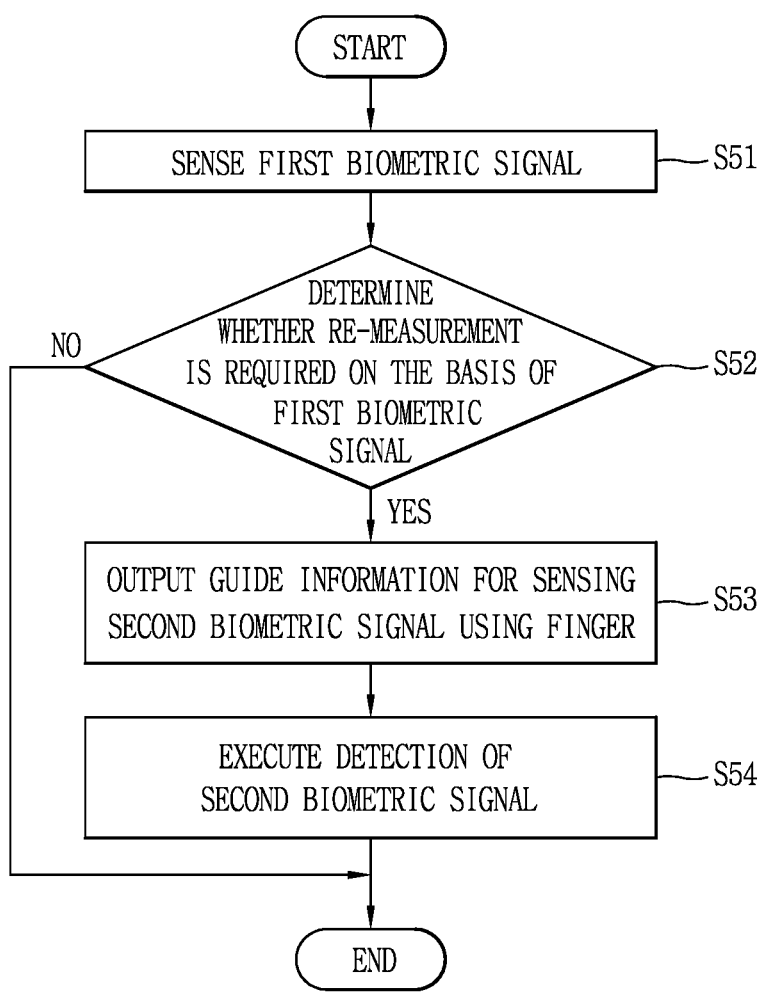
FIGS. 8A to 8C are conceptual views illustrating a control method of forming biometric data using a finger according to another embodiment of the present disclosure.
Figure 8B:
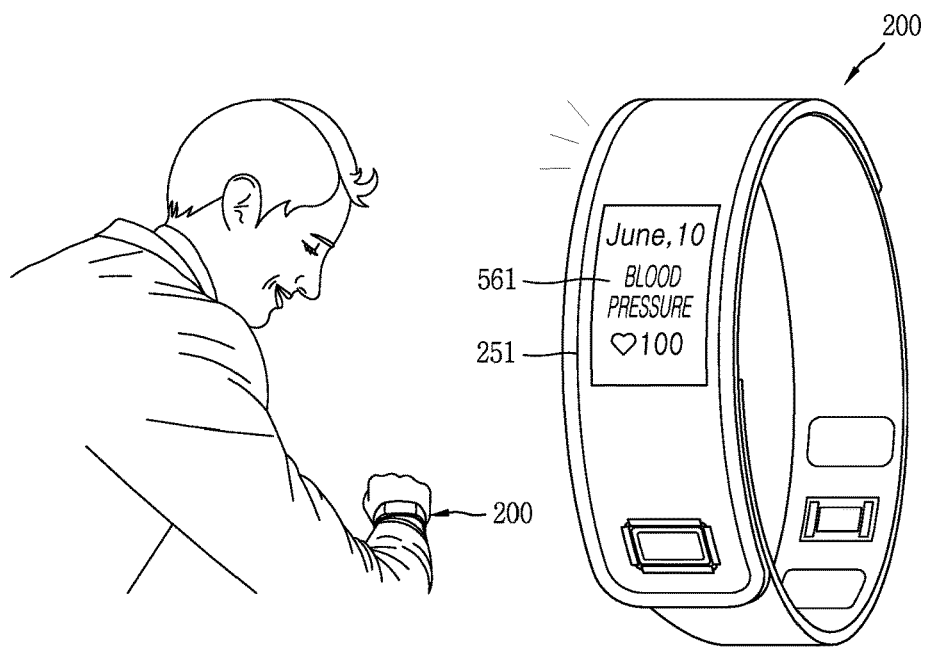
Figure 8B:
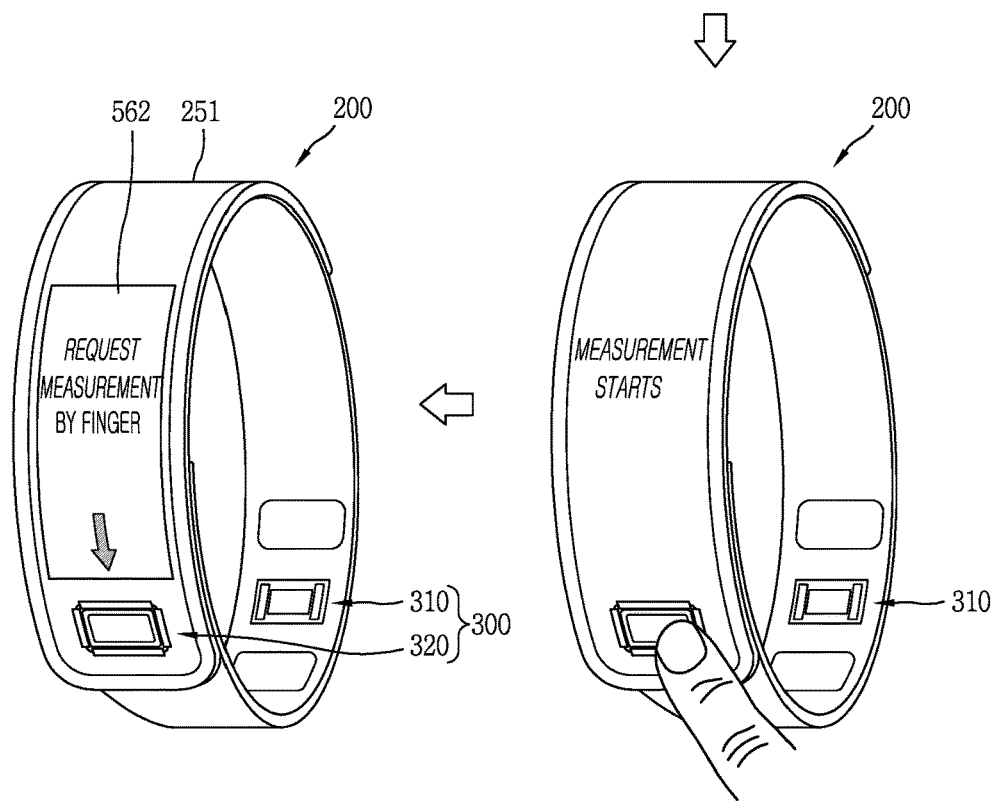
Figure 8C:
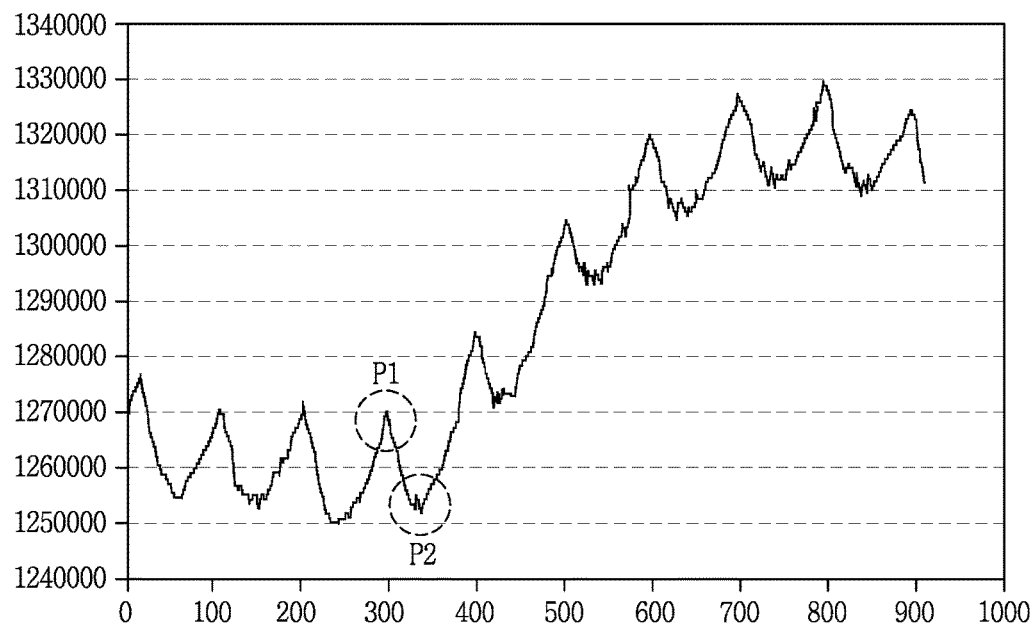
Figure 8C:
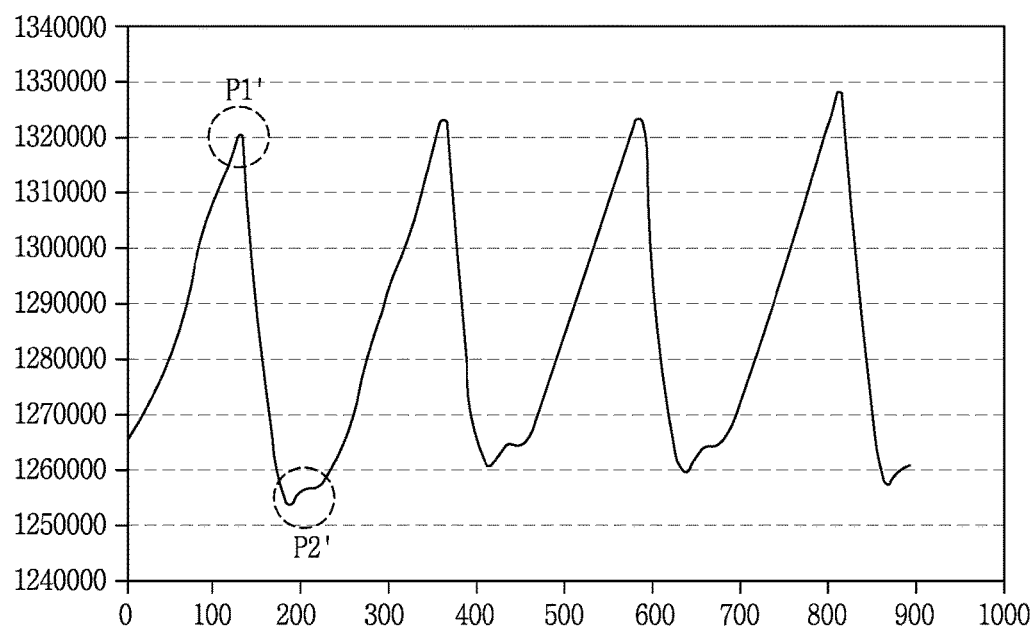

FIGS. 8A to 8C are conceptual views illustrating a control method of forming biometric data using a finger according to another embodiment of the present disclosure. Referring to FIG. 8A, the controller 280 detects a first biometric signal (S51). The controller determines whether re-measurement is required based on the first biometric signal (S52). When the first biometric signal is detected, the display unit outputs first result information 561.

The first biometric signal is measured by the first sensing module 310. That is, the user can obtain the first biometric signal without applying a specific control command or without contacting a specific region in a state of wearing the watch type terminal 200. That is, the first biometric signal is detected at a preset time interval or when a specific event occurs, without an additional control command of the user.

When it is determined that re-measurement is required based on the first biometric signal, the controller 280 controls the display unit to output a guide screen 562 for detecting a second biometric signal using a finger (S53). For example, when the first biometric signal is determined to be abnormal when compared with a preset reference, or when the first biometric signal is determined to be unstable based on a specific reference, the controller outputs guide information for detecting the second biometric signal.

Referring to FIG. 8B, the display unit outputs a guide screen 562 indicating the second sensor module 320. For example, when the second sensor module 320 is disposed to be adjacent to one end portion of the display unit of the watch type terminal 200, the guide screen 562 may include an image indicating a position of the second sensor module 320. Further, the guide screen 562 may include an image and/or text instructing that the user's finger should contact the second sensor module 320.

When the user's finger contacts the second sensor module 320, the controller 280 controls the second sensor module 320 to detect a second biometric signal. The display unit may output a measurement screen indicating that the second biometric signal is being measured.

In particular (a) of FIG. 8C is a graph illustrating a PPG signal measured in a state in which a wrist region is in contact with a first biometric module, and (b) of FIG. 8C is a graph illustrating a PPG signal measured in a state in which a finger region is in contact with the second sensor module 320. The finger region is a region which corresponds to an end region of a human body, in which a change in signal according to movement of blood is sensitively measured. Thus, a difference between a minimum peak point P2' and a maximum peak P1' is formed to be greater than a difference between a minimum peak point P2 and a maximum peak point P1 of the PPG signal (about 20 times). Thus, more accurate biometric data may be formed by the difference value between the peak points.

Thus, when the watch type terminal 200 is worn on the user's body, a first biometric signal is measured by the first sensor module 310 in contact with the user's wrist without an additional control command of the user, and if necessary, it is possible to guide the user to measure a second biometric signal. Thus, if necessary, the biometric signal can be accurately measure to form accurate biometric data.

Figure 9A:
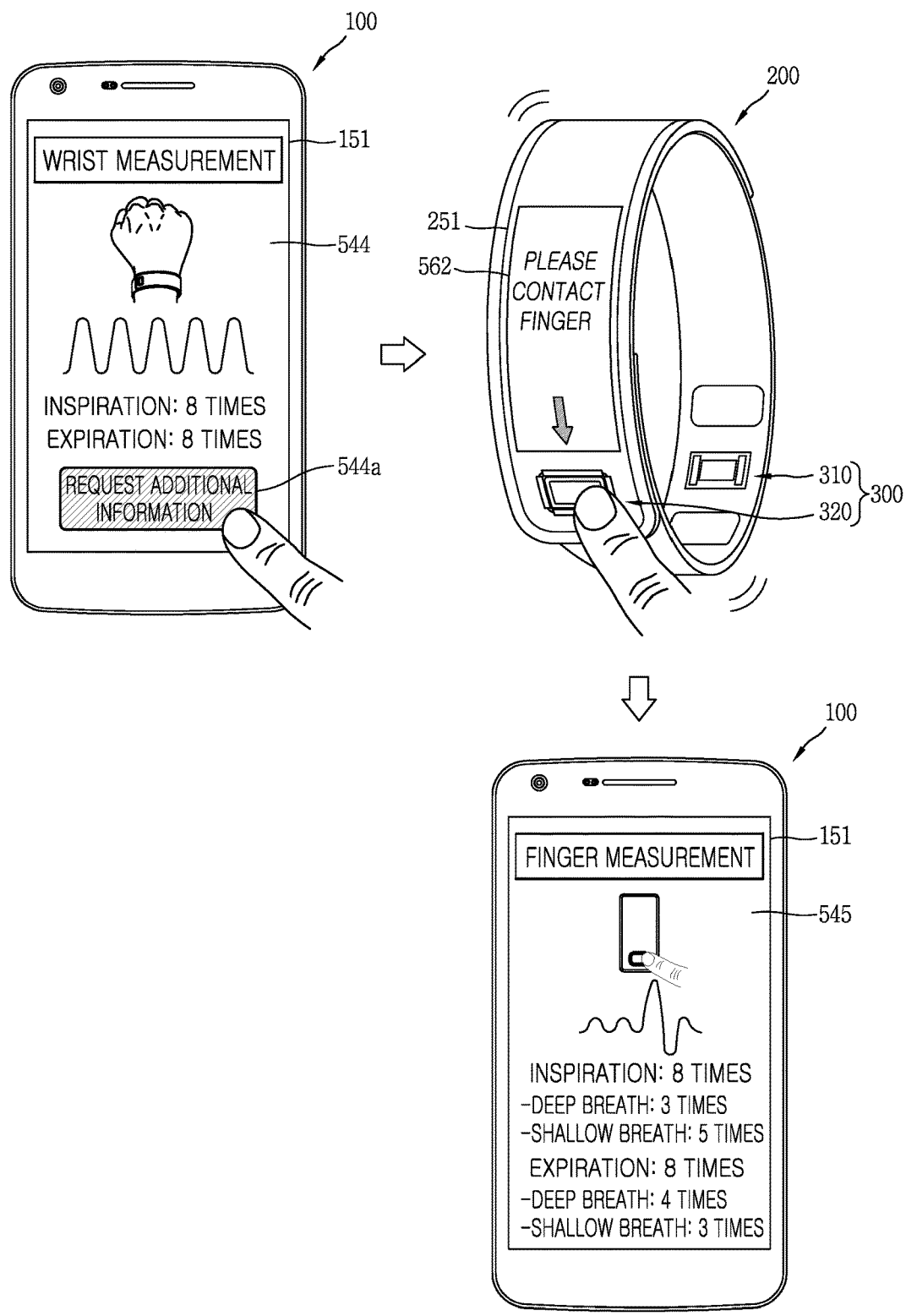
FIGS. 9A to 9C are conceptual views illustrating a control method of measuring a second biometric signal according to another embodiment of the present disclosure.
Figure 9B:
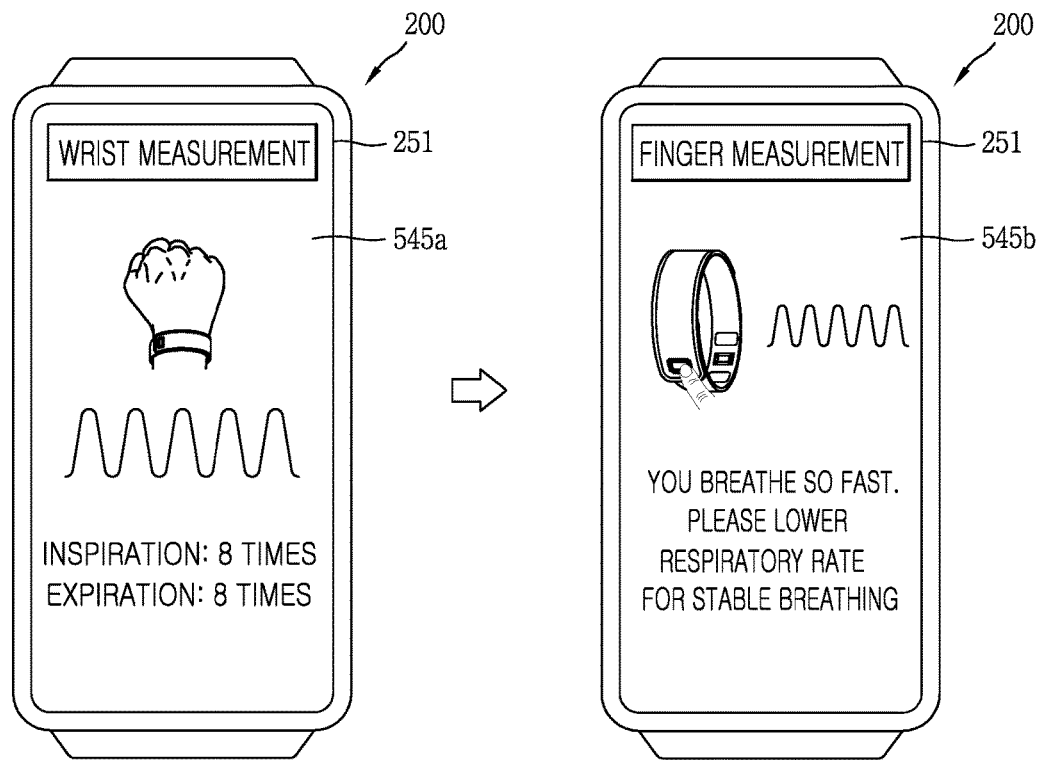
Figure 9C:
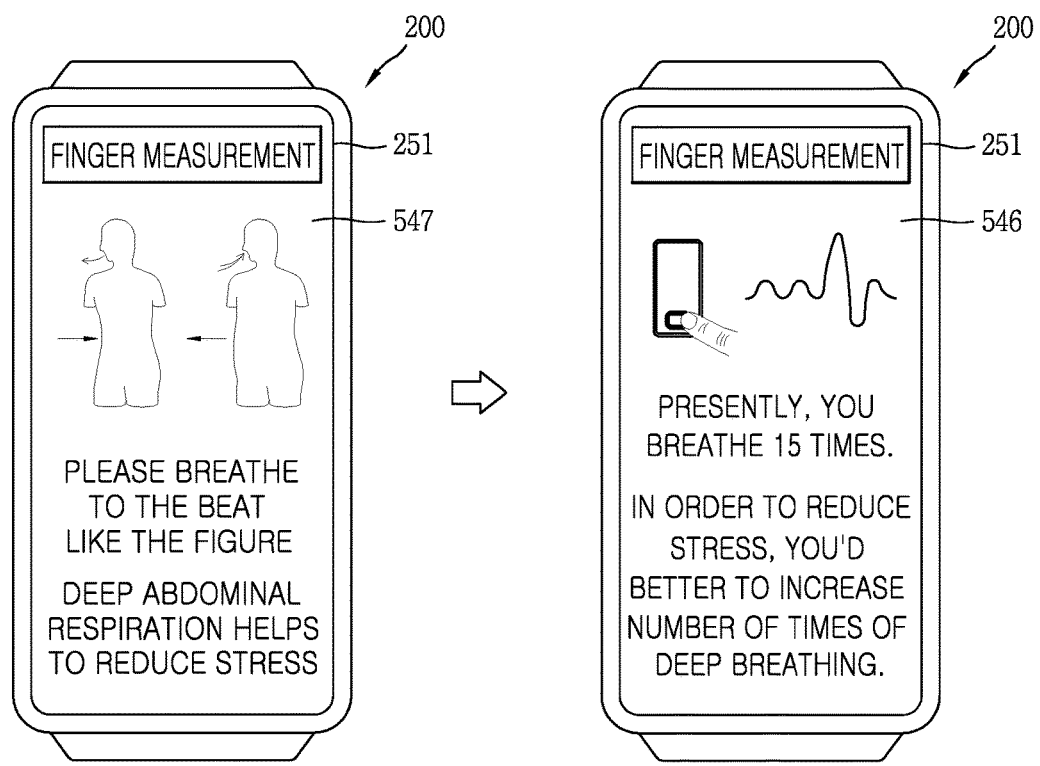

Next, FIGS. 9A to 9C are conceptual views illustrating a control method of measuring a second biometric signal according to another embodiment of the present disclosure. Referring to FIG. 9A, when a first biometric signal is detected by the first sensor module 310, the controller 280 can transmit the first biometric signal to the external device 100. The display unit 151 of the external device 100 outputs a first biometric signal result 544 and outputs a graphic image 544a for measuring a second biometric signal together with the result 544 of the first biometric signal.

When a touch applied to the graphic image 544a is received, the controller 280 controls the display unit to output a guide screen 562. When the user's finger contacts the second sensing module 320, the controller 280 detects the second biometric signal. The controller 280 transmits the second biometric signal to the external device 100, and the external device 100 displays a second biometric signal result 545 on the display unit 151 based on the received second biometric signal.

According to the present embodiment, the user recognizes the result of the first biometric signal, and if necessary additionally, the second biometric signal may be detected to provide more accurate biometric data. Data included in the first and second biometric signal results 545a and 545b will be described with reference to FIG. 9B. For example, the first biometric signal result 545a represents the number of inspirations and expirations in relation to respiration.

The second biometric signal result 545b includes guide information based on the number of respirations and a speed of the respiration in relation to the respiration. Accordingly, the controller 280 provides result information differentiated based on the wrist and finger. That is, when the user's finger contact the sensing module, the controller sequentially performs steps of forming biometric data with a detected biometric signal, comparing the biometric data with reference data, determining whether the user's body is in a normal/abnormal condition, and forming corresponding guide information.

Referring to FIG. 9C, the display unit 251 can repeatedly output first and second guide screens 546 and 547 including different types of guide information. For example, the first guide screen 546 includes formed biometric data and analysis information thereof. The second guide screen 547 may include guide information for a change in the user's body based on the analysis information. The controller outputs the first and second guide screens 546 and 547 for a specific period of time or continuously outputs until a biometric signal detected by the second sensing module 320 corresponds to a normal range.

Figure 10A:
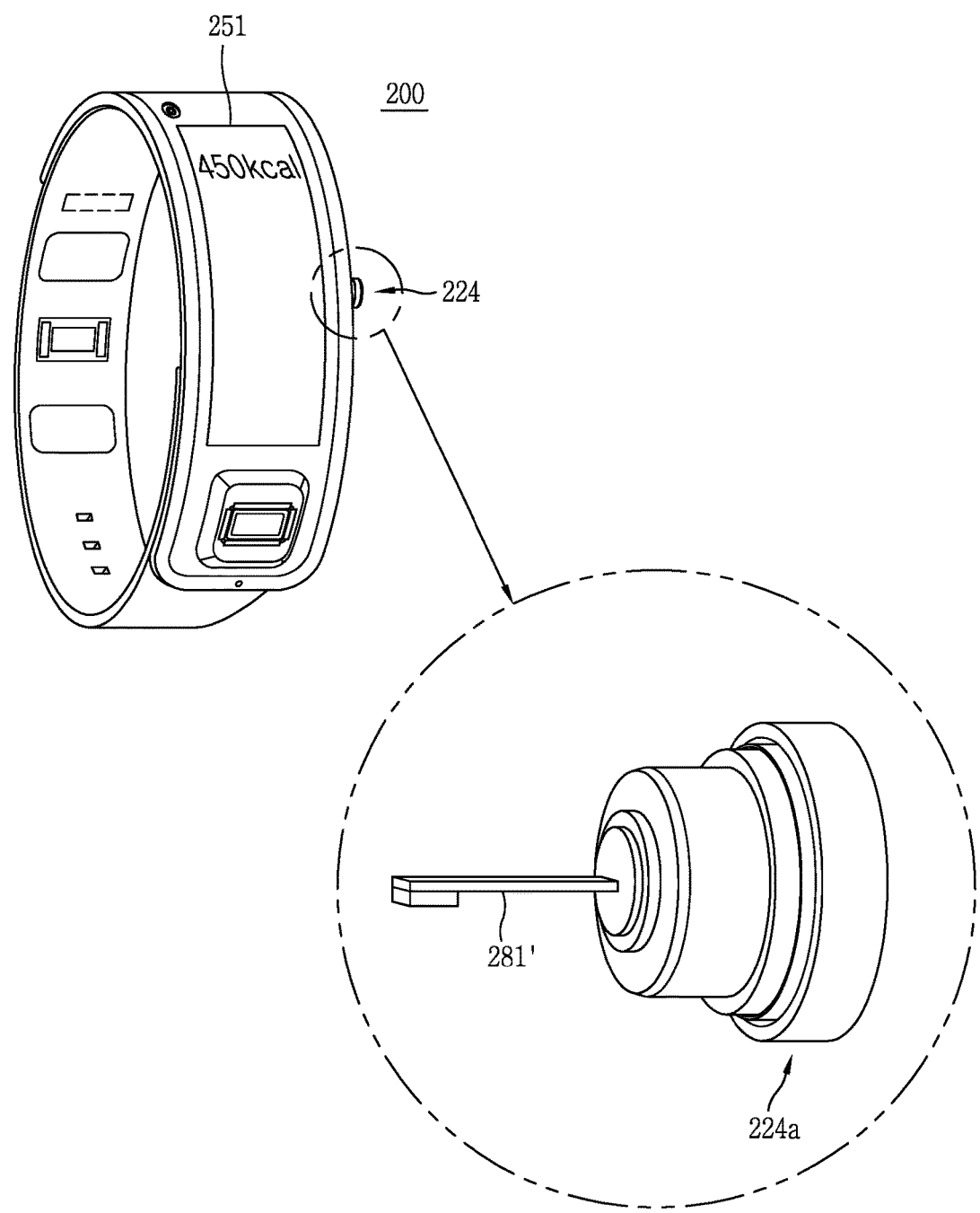
FIGS. 10A to 10D are conceptual views illustrating a third sensing module installed in a stem of a watch type terminal according to another embodiment of the present disclosure.

Next, FIGS. 10A to 10D are conceptual views illustrating a third sensing module installed in a stem of a watch type terminal according to another embodiment of the present disclosure. Referring to FIG. 10A, the watch type terminal according to the present embodiment further includes a stem portion 224 formed to be pressed or rotatable to input a control signal. A flexible circuit board 281' is connected to a region of the stem portion 224 disposed within the first case 201a of the watch type terminal 200.

Figure 10B:
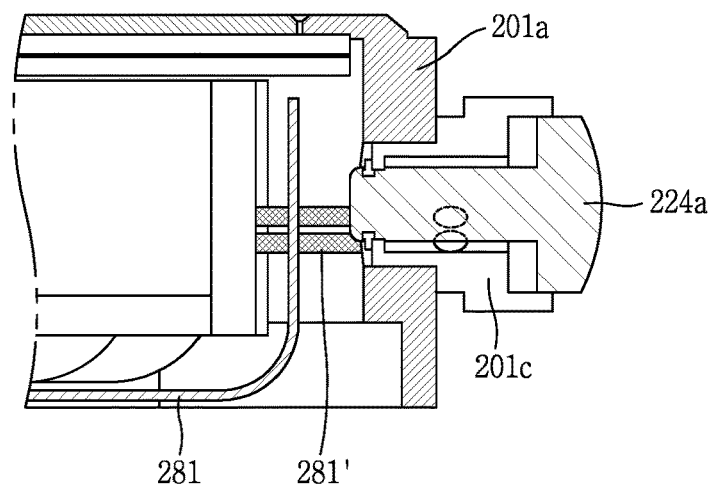
Figure 10C:
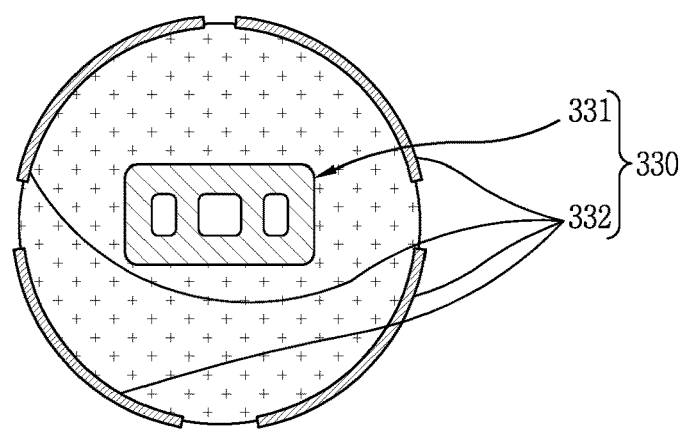

FIG. 10B is a partial cross-sectional view illustrating a structure of the stem portion 224. Referring to FIG. 10B, a third case 201c in which the step portion 224 is disposed to be pressed is disposed in a region of a first case 201a. A body of the stem portion 224 is installed in an accommodation space of the third case 201c. The flexible circuit board 281' is electrically connected to a main circuit board 281.

A third sensing module 330 is formed on one surface exposed to outside of the stem portion 224. The third sensing module 330 includes a PPG sensor and a plurality of electrode units 332. For example, the PPG sensor 331 is disposed in a central region of a cross-section of the stem portion 224, and the plurality of electrode units 332 are formed to surround the PPG sensor 331 such that they are insulated from each other.

Figure 10D:
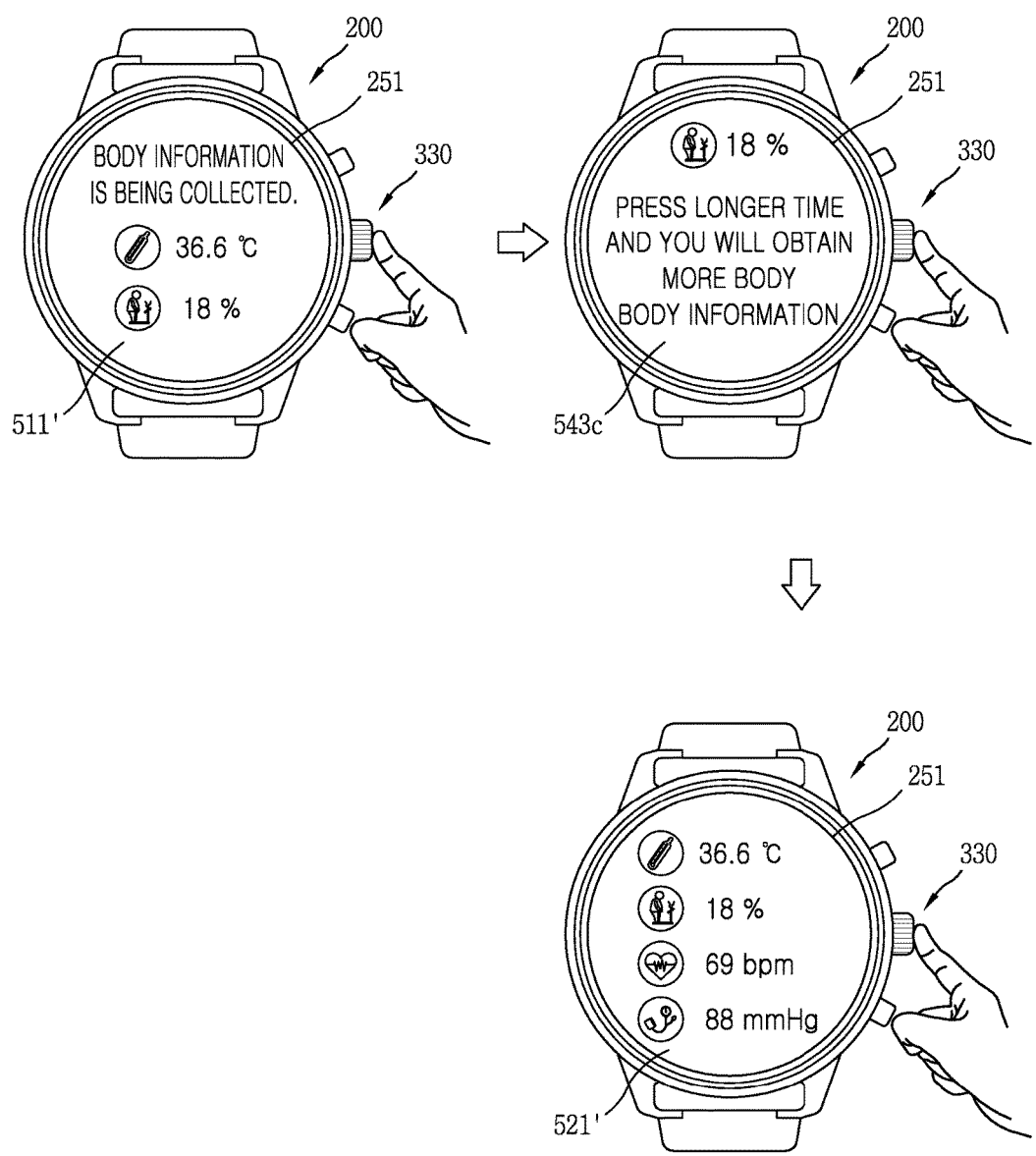

A control method of guiding a type of a detected biometric signal according to time during which part of the user's body contacts the third sensing module 330 will be described with reference to FIG. 10D. When part of the user's body contacts the third sensing module 330 while a control signal is being formed through the stem portion 224, the controller 280 controls the third sensing module 330 to detect a biometric signal.

The controller 280 controls the display unit to output a measurement screen 511'. The measurement screen 511' may include biometric data formed using the detected biometric signal. The controller 280 controls the display unit to output third guide information 543c guiding continuous contact to form additional biometric data. The third sensor module 330 may detect more biometric signals to form more biometric data according to time during which part of the user's body contacts the third sensor module 330. For example, it may take about two seconds to measure a body temperature, about three to five seconds to measure body fat, about six to ten seconds to measure heartbeat, about 15 seconds to measure blood pressure, and about 30 seconds to measure a stress index.

The third guide information 543c is not limited to the information illustrated in the drawing. For example, the third guide information 543c may be information regarding a type of biometric data and time required for obtaining biometric data.

According to the present embodiment, a biometric signal may be detected by a finger contacted while the user is inputting a control signal using the stem portion. Accordingly, the biometric signal may be detected although not intended, while the user is applying a control signal, and when an additional measurement is desired based on guide information, a biometric signal may be continuously detected to form biometric data.

Figure 11A:
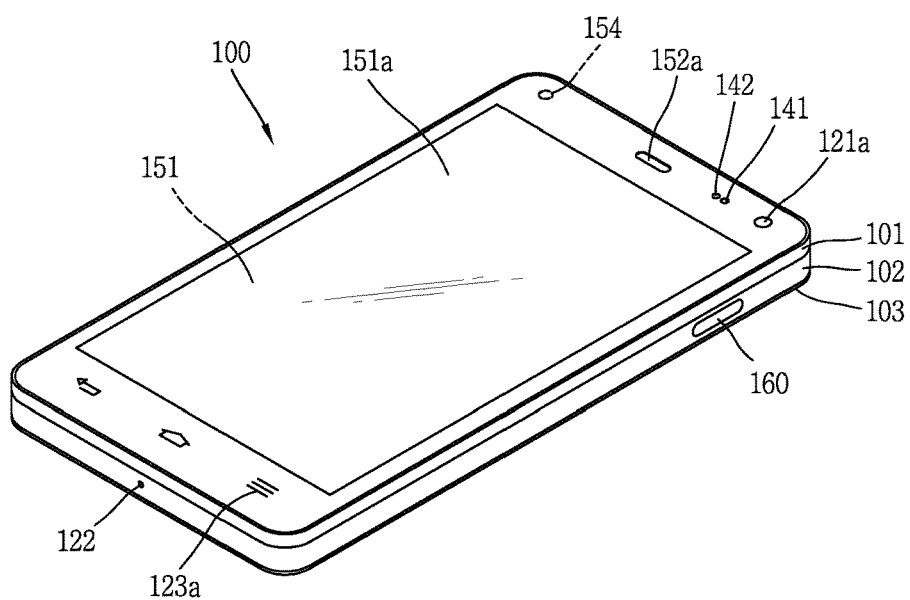
FIGS. 11A to 11C are conceptual views illustrating a fourth sensing module formed in a mobile terminal according to another embodiment of the present disclosure.
Figure 11B:
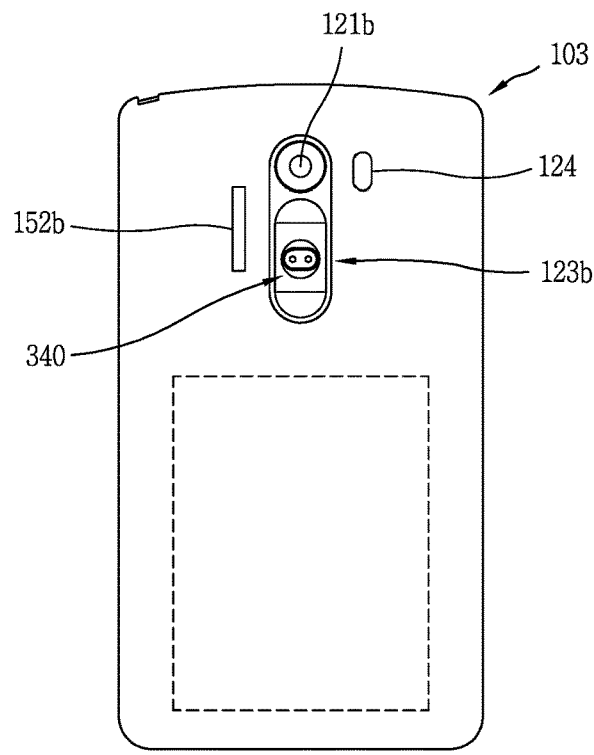
Figure 11C:
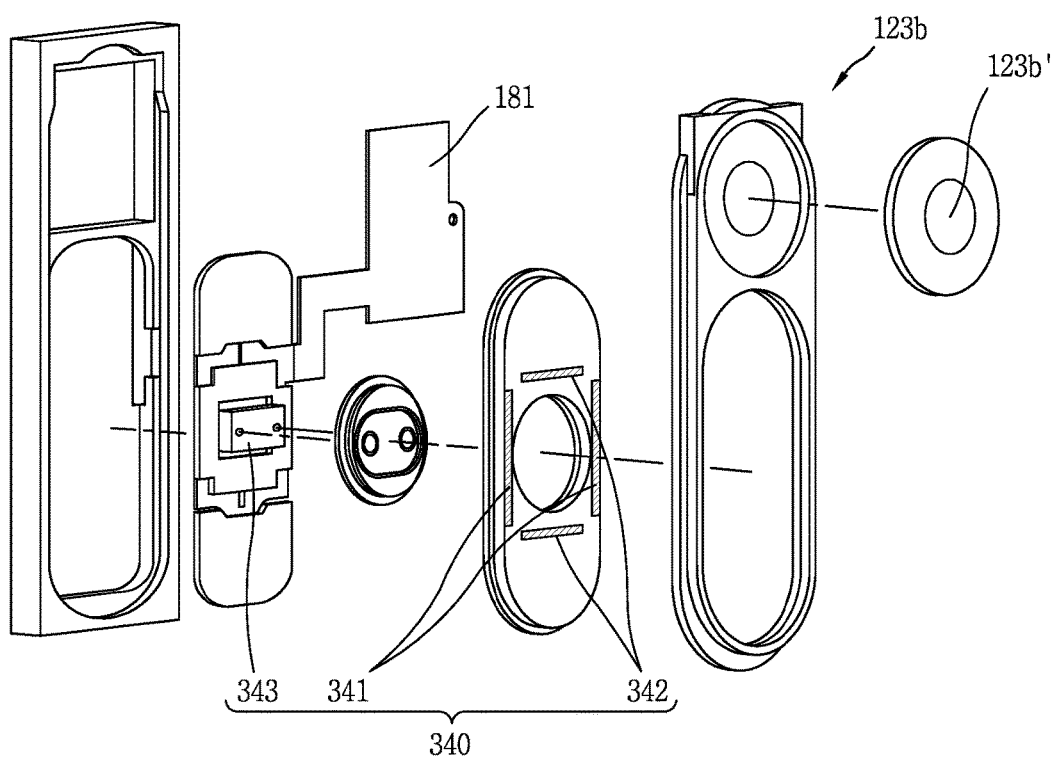

FIGS. 11A to 11C are conceptual views illustrating a fourth sensing module formed in a mobile terminal 100 according to another embodiment of the present disclosure. In particular, FIG. 11A is a view of a mobile terminal viewed in one direction according to an embodiment, FIG. 11B is a view illustrating a rear side on which a second manipulation unit is formed, and FIG. 11C is a conceptual view illustrating a structure of a fourth sensing module formed in the second manipulation unit.

Referring to FIGS. 11A and 11B, the mobile terminal 100 has a bar type terminal body. However, the present disclosure is not limited thereto and can alternatively be implemented in any of a variety of different configurations. Examples of such configurations include watch type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by a rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 can be configured such that one case forms the inner space. In this example, a mobile terminal 100 having a uni-body is formed so synthetic resin or metal extends from a side surface to a rear surface.

If desired, the mobile terminal 100 can include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 can include the display unit 151, the first audio output module 152a, the second audio output module 152b, the proximity sensor 141, the illumination sensor 142, the optical output module 154, the first camera 121a, the second camera 121b, the first manipulation unit 123a, the second manipulation unit 123b, the microphone 122, the interface unit 160, etc. Hereinafter, the mobile terminal 100 will be explained with reference to FIGS. 1B and 1C. The display unit 151, the first audio output module 152a, the proximity sensor 141, the illumination sensor 142, the optical output module 154, the first camera 121a and the first manipulation unit 123a are arranged on the front surface of the terminal body. The second manipulation unit 123b, the microphone 122 and the interface unit 160 are arranged on the side surfaces of the terminal body. The second audio output module 152b and the second camera 121b are arranged on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the control unit 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output unit 152a may be implemented as a receiver for transmitting a call sound to a user's ears, and the second audio output unit 152b may be implemented as a loud speaker for outputting each type of alarm sounds or a play sound of multimedia.

It may be configured such that the sounds generated from the first audio output module 152a are released along an assembly gap between the structural bodies (e.g., between the window 151a and the front case 101). In this case, a hole independently formed to output audio sounds may not be seen or hidden in terms of appearance, thereby further simplifying the appearance of the mobile terminal 100.

The optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented in such a manner that the mobile terminal emits monochromatic light or light with a plurality of colors. The signal output may be terminated as the mobile terminal senses that a user has checked the generated event, for example.

The first camera 121a processes image data of still pictures or video acquired by an image capture device in a video capturing mode or an image capturing mode. The processed image frames may be displayed on the display unit 151, or may be stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may be implemented in a user's non-tactile manner, e.g., by a proximity touch, a hovering touch, etc. FIG. 11A illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit 123*b* may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit 123*b* can be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. A control unit of the mobile terminal 100 can then use fingerprint information detected by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 11B, a flash 124 is shown adjacent to the second camera 121*b*. When an image of a subject is captured with the camera 121*b*, the flash 124 can illuminate the subject. As shown in FIG. 11B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module may be retractable into the terminal body. Alternatively, an antenna may be formed using a film attached to an inner surface of the rear cover 103, or a case that includes a conductive material.

A power supply unit for supplying power to the mobile terminal 100 may include a battery, which is mounted in the terminal body or detachably coupled to an outside of the terminal body. The battery may receive power via a power source cable connected to the interface unit 160. Also, the battery can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery, and to protect the battery from an external impact or from foreign material. When the battery is detachable from the terminal body, the rear case 103 may be detachably coupled to the rear case 102.

Referring to FIG. 11C, the second manipulation unit 123*b* includes a button unit 123*b*' formed to be pressed to form a control signal. A fourth sensor module 340 is formed to overlap the button unit 123*b*'. The fourth sensor module 340 includes a pair of electrode units 341 detecting a body temperature and a pair of second electrode units 341 and 342 measuring body fat, and a PPG sensor 343. The first and second electrode units 341 and 342 are disposed to surround the PPG sensor 343. The first and second electrode units 341 and 342 are electrically connected to a circuit board disposed within the mobile terminal 100.

The button unit 123*b*' may further include a fingerprint sensor formed to detect a fingerprint. Thus, the control unit can form a control signal based on a finger contacting the button unit 123*b*', detects a fingerprint, and detects a specific biometric signal. Thus, a biometric signal may be obtained without intentional controlling by the user, while a specific function is being executed through a control signal.

Figure 12A:
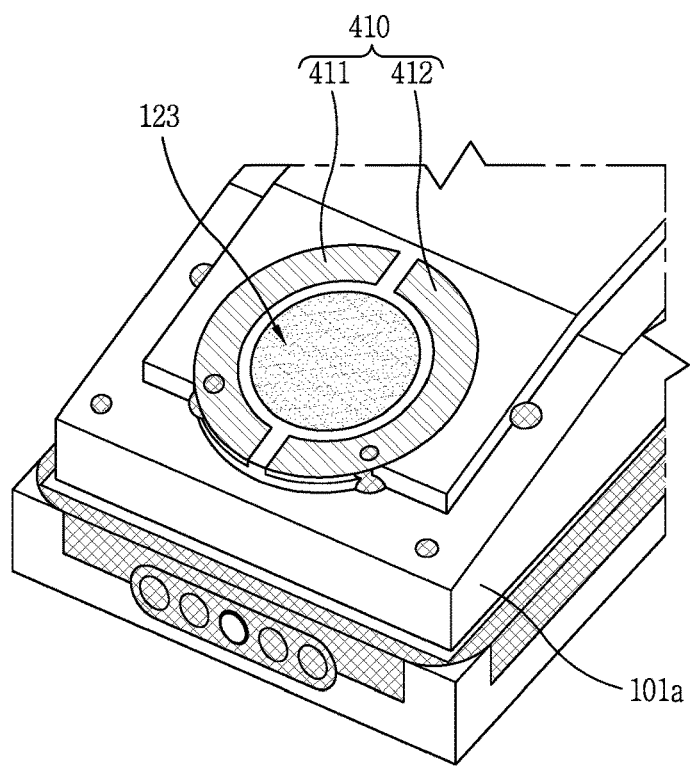
FIGS. 12A and 12B are conceptual views illustrating a structure of a second electrode unit disposed together with a manipulation unit.
Figure 12B:
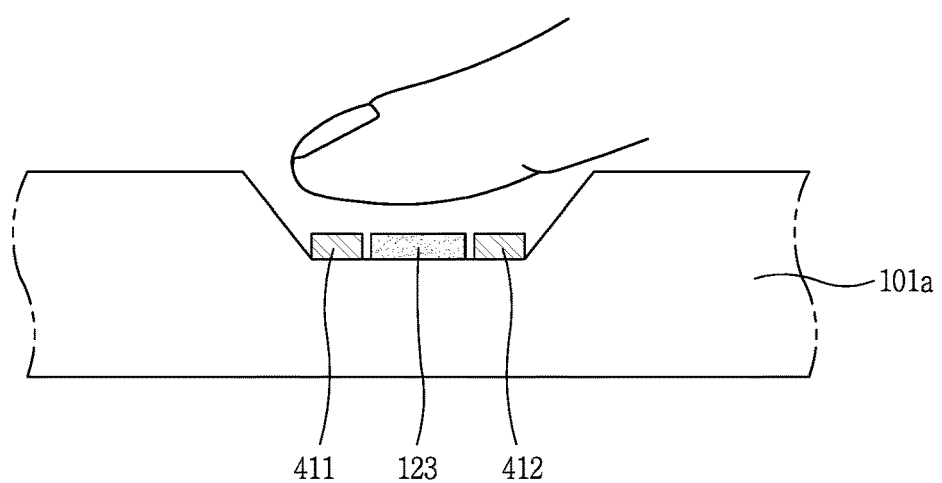

FIGS. 12A and 12B are conceptual views illustrating a structure of a second electrode unit disposed together with a manipulation unit. For example, first and second electrodes 411 and 412 of a second electrode unit 410 are formed to be adjacent to a user input unit 123 configured as a press key. The first and second electrodes 411 and 412 can serve as a current electrode applying a current to a human body and a voltage electrode measuring impedance, respectively.

The user input unit 123 may be implemented to form a control signal when pressed by an external force. The first and second electrodes 411 and 412 may be formed along an edge of the user input unit 123. For example, when the user input unit 123 includes a circular key, the first and second electrodes 411 and 412 may be formed along an outer circumferential surface of the circular key. The first and second electrodes 411 and 412 may be formed not to be in contact with each other. A first case 101a of the main body 101 disposed between the circular key and the first and second electrodes 411 and 412 is formed as an insulating member.

Preferably, an area of the first and second electrodes 411 and 412 surrounding the user input unit 123 is not greater than a width of the user's finger, but the present disclosure is not limited thereto. Also, the first and second electrodes 411 and 412 and the user input unit 123 may be coplanar.

According to an embodiment of the present disclosure, the first and second electrodes 411 and 412 of the second electrode unit 410 are disposed to be adjacent to each other. Thus, since the user's finger may contact both the first and second electrodes 411 and 412, the user does not need to bring the human body into contact with the two electrodes using two or more fingers. Thus, the user's body may contact the first and second electrode units, while maintaining more stable posture, and thus, an appropriate posture may be maintained, while securing body composition information.

FIG. 12B is a cross-sectional view of the first case 101a in which the user input unit and the first and second electrodes 411 and 412 are disposed. Referring to FIG. 12B, a region in which the first and second electrodes 411 and 412 and the user input unit 123 are formed may be depressed, relative to other region of the first case 101a.

Since the region in which the first and second electrodes 411 and 412 and the user input unit 123 are provided is depressed, relative to the other region of the first case 101a, the user's finger may more accurately contact the first and second electrodes 411 and 412 through a sense of touch. Thus, a problem that only the user's finger contact only a region of the first and second electrodes 411 and 412 may be prevented.

In the drawing, the first and second electrodes 411 and 412 and the user input unit 123 are disposed on the same plane of the depressed region of the first case 101a, but the present disclosure is not limited thereto. For example, the first and second electrodes 411 and 412 may be disposed on a side surface (an inclined plane) forming a depressed region of the first case 101a.

The user can recognize the depressed region of the main body 101 in a tactile manner and put his finger to the depressed region such that his dinger may be in contact with the entire region of the first and second electrodes 411 and 412. Thus, an impedance value may be more accurately obtained.

When the mobile terminal is worn on the human body, the second electrode unit according to the present disclosure is formed in a region of a main body exposed to the outside. Preferably, the second electrode unit is formed on a surface where the user can easily contact his finger (where the display unit 151 is disposed).

Figure 13A:
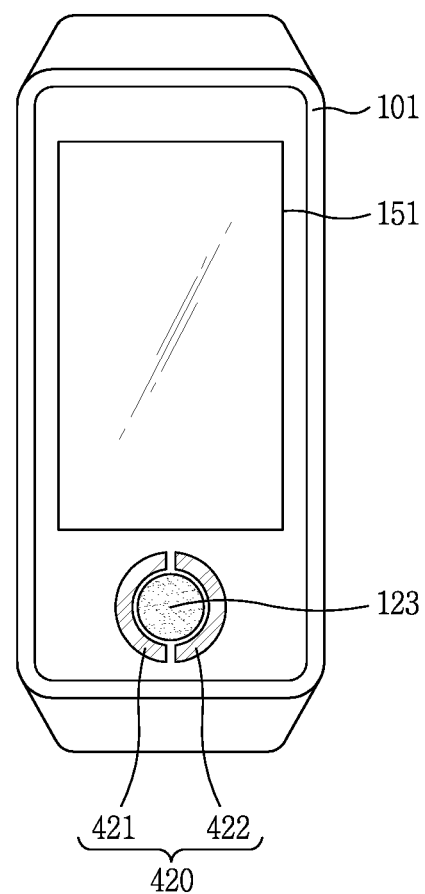
FIGS. 13A and 13B are conceptual views illustrating a layout structure of the second electrode unit disposed to be adjacent to the user input.
Figure 13B:
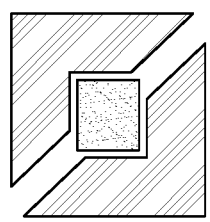
Figure 13B:
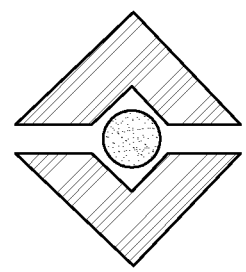
Figure 13B:
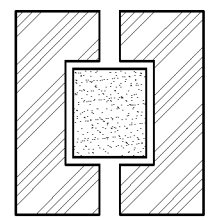
Figure 13B:
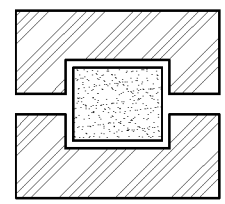
Figure 13B:
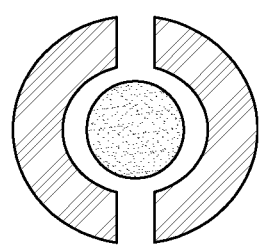
Figure 13B:
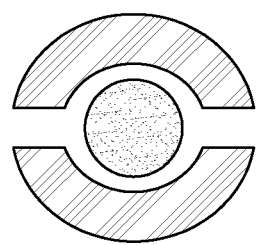
Figure 13B:
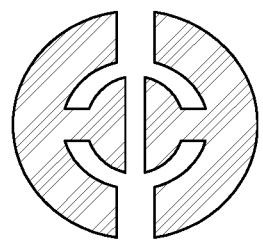

FIGS. 13A and 13B are conceptual views illustrating a layout structure of the second electrode unit disposed to be adjacent to the user input. Referring to FIG. 13A, the user input unit 123 and the second electrode unit 420 are disposed on one surface where the display unit 151 is disposed. The second electrode unit 420 includes first and second electrodes 421 and 422 forming a space. The user input unit 123 is formed between the first and second electrodes 421 and 422.

FIG. 13B illustrates various structures in which a user input unit is disposed between first and second electrodes. Referring to (a) and (b) of FIG. 13B, a quadrangular space is formed between first and second electrodes. The user input unit 123 is disposed in the space. The user input unit 123 may be configured as a key button having a circular cross-section, but a shape thereof is not limited thereto.

Referring to (c) and (d) of FIG. 13B, first and second electrodes have a "⊏" shape, facing each other, and a quadrangular space is formed therebetween. The user input unit 123 may be formed as a quadrangular key button corresponding to the space. Referring to (e) and (f) of FIG. 13B, first and second electrodes may have a "C" shape, facing each other, such that a space therebetween has a circular shape. A key button of the user input unit 123 disposed in the space may have a circular shape.

Referring to (g) of FIG. 13B, first and second electrodes having an "E" shape are disposed to face each other, and although not shown in the drawing, a press key may be disposed in a central region such that a control command may be applied by pressing. According to the present embodiments, since the user input unit is formed in the space between the first and second electrodes, efficiency of space utilization may be enhanced.

Figure 14A:
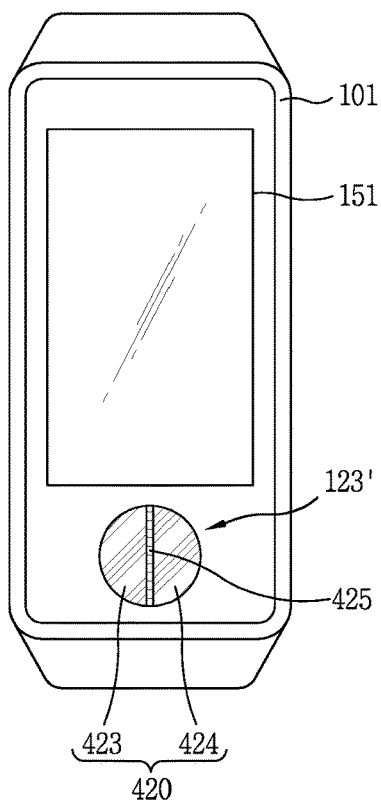
FIGS. 14A and 14B are conceptual views illustrating a layout structure of a user input unit and a second electrode unit.
Figure 14B:
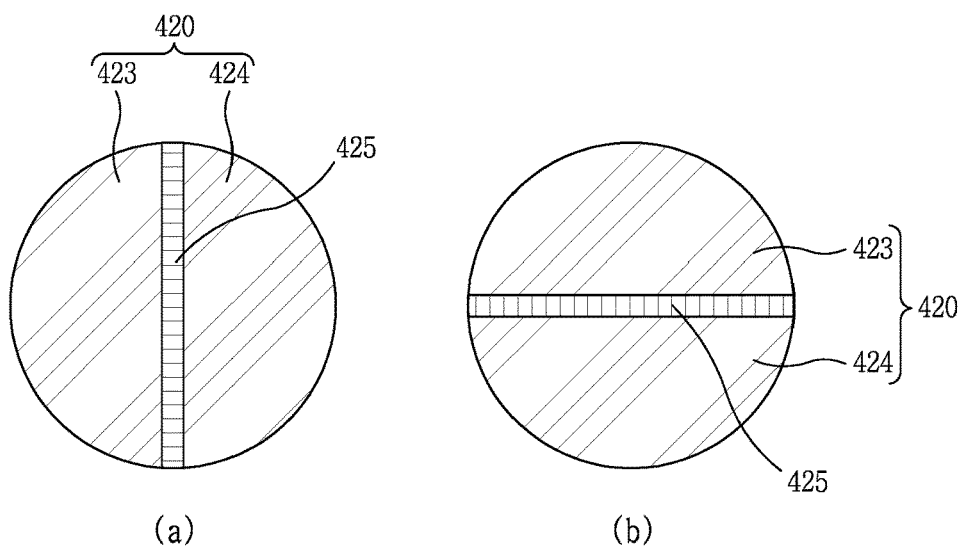

FIGS. 14A and 14B are conceptual views illustrating a layout structure of a user input unit and a second electrode unit. A user input unit and a second electrode unit according to the present embodiment are integrally formed, which will be referred to as a key electrode module 123'. The key electrode module 123' includes first and second electrodes 423 and 424.

When the user's finger contacts the first and second electrodes 423 and 424, a current flows and the controller 180 can calculate an impedance value. Meanwhile, when an external force is applied to the first and second electrodes 423 and 424 and/or a pressing part 425, the first and second electrodes 423 and 424 and the pressing part 425 are moved together.

Referring to (a) of FIG. 14B, the first and second electrodes 423 and 424 and the pressing part 425 forming an appearance of the main body may have a circular shape. An end portion of the pressing part 425 may have a bar shape extending in one direction, but the present disclosure is not limited thereto.

Also, referring to (b) of FIG. 14B, a direction of the pressing part 425 may be variously implemented. When the user's finger contacts a key electrode module according to the present embodiment, an impedance value may be obtained by the first and second electrodes 423 and 424. Meanwhile, when an external force is applied to the key electrode module so the pressing part 425 is moved, a control command may be input. In this instance, while the control command is being applied, the impedance value may be measured to obtain body composition data.

Figure 15A:
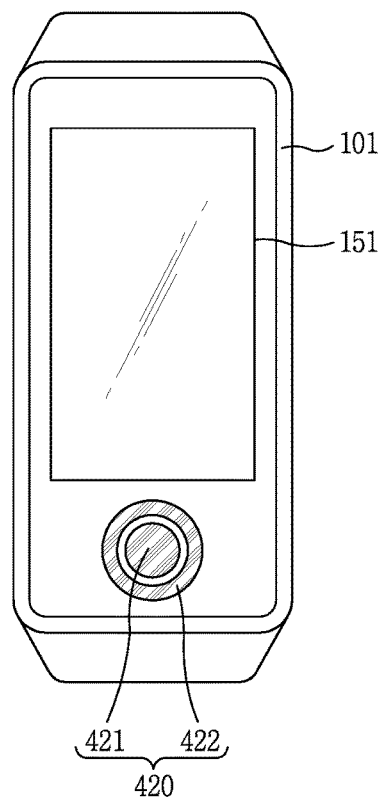
FIGS. 15A and 15B are conceptual views illustrating a key electrode module in which a user input unit and a second electrode unit are integrally formed.
Figure 15B:
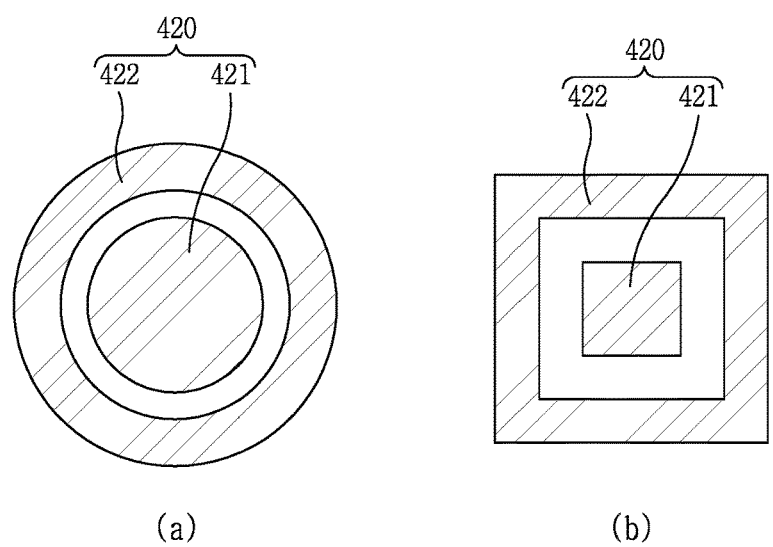

FIGS. 15A and 15B are conceptual views illustrating a key electrode module in which a user input unit and a second electrode unit are integrally formed. Referring to FIGS. 15A and 15B, a second electrode unit 420 includes a first electrode 421 and a second electrode 422 formed to surround the first electrode 421. Referring to (a) of FIG. 15B, when a cross-section of the first electrode 421 has a circular shape, a cross-section of the second electrode 422 may have a circular band shape. Referring to (b) of FIG. 15B, when a cross-section of the first electrode 421 has a quadrangular shape, a cross-section of the second electrode 422 may have a quadrangular band shape.

According to the present disclosure, since target biometric data required for a user is determined based on a detected user's biometric signal, specific information according to a change in the user's body may be received even though the user does not separately apply a control command. Also, since the target biometric data is formed selectively using a detected biometric signal, an additional sensor is not required.

According to the present embodiment, there is no need to separately form a structure of a press key with respect to a component of the electrode unit. Thus, both the electrode unit and the user input unit may be formed in a narrow area of the main body.

The embodiments of the present disclosure provide a mobile terminal capable of measuring biometric information with improved accuracy, and thus, the present disclosure may be applied to various industrial fields.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A watch type terminal comprising:
a main body mountable on part of a user;
at least one biometric sensor installed in the main body; and
a controller configured to:
control the at least one biometric sensor to detect a biometric signal of the user,
determine target biometric data for the user to be collected based on the detected biometric signal,
control the at least one biometric sensor to detect additional biometric signals of the user to collect the target biometric data, and
output the target biometric data to the user,
wherein the at least one biometric sensor comprises:
a first sensor formed to be in contact with the user's wrist when the main body is mounted on the user, and
a second sensor disposed in another region of the main body separate from the first sensor, and
wherein the controller is further configured to:
control the first sensor to detect the biometric signal at a preset time interval, and
activate the second sensor to detect the additional biometric signals based on the biometric signal and previously stored reference data.

2. The watch type terminal of claim 1, wherein the controller is further configured to:
control the first sensor to detect the biometric signal at a first period, and
control the second sensor to detect the additional biometric signals for collecting the target biometric data at each second period shorter than the first period.

3. The watch type terminal of claim 1, wherein the main body further includes a user input unit, and
wherein the second sensor is disposed to be adjacent to the user input unit.

4. The watch type terminal of claim 3, wherein the main body further includes a display configured to display guide information guiding a contact position of a finger to detect the additional biometric signals by the second sensor.

5. The watch type terminal of claim 4, wherein the display is further configured to:
display different result screens based on biometric signals detected by the first and second sensors, and
display the guide information by comparing the additional biometric signals detected by the second sensor with reference data.

6. The watch type terminal of claim 1, wherein the controller is further configured to determine the biometric data corresponding to an occurring event and activate the at least one biometric sensor based on the occurrence of the event.

7. The watch type terminal of claim 6, wherein the event occurs by data stored in a memory or a wireless signal received from an external device.

8. The watch type terminal of claim 1, further comprising:
a stem portion installed in the main body and configured to be movable and rotatable to input a control signal, and
wherein the at least one biometric sensor includes an additional sensor disposed to be adjacent to the stem portion.

9. The watch type terminal of claim 8, wherein the main body includes a display, and
wherein the controller is further configured to:

control the at least one biometric sensor to detect the biometric signal while the control signal is being input, and control the display to display guide information including information regarding a type of detected biometric signal and a detection time.

10. The watch type terminal of claim 1, further comprising:

at least one sensor configured to detect a movement of the main body and a state of a surrounding environment of the main body.

11. The watch type terminal of claim 1, wherein when the biometric signal is within an abnormal range based on previously stored reference data, the controller is further configured to control the second biometric sensor to detect the additional biometric signals of the user to collect the target biometric data.

12. The watch type terminal of claim 1, wherein the main body includes a display, and wherein the controller is further configured to:

compare the target biometric data with reference data, and when the target biometric data is within an abnormal range, control the display to display a notification window including a notification that the target biometric data is within the abnormal range.

13. The watch type terminal of claim 12, wherein the controller is further configured to:

execute a specific application, and display the notification window together with an execution screen of the application.

14. The watch type terminal of claim 12, wherein the controller is further configured to adjust a number of times of displaying the notification window through comparison between the target biometric data and the reference data.

15. The watch type terminal of claim 12, wherein the controller is further configured to:

determine the target biometric data corresponding to a preset particular body issue, and output analysis result information based on the target biometric data formed by the biometric signal.

16. The watch type terminal of claim 1, wherein the at least one biometric sensor includes at least one of a first electrode unit measuring a body temperature, a second electrode unit measuring impedance of the human body, a PPG sensor, and an oxygen measurement sensor.

17. A method of controlling a watch type terminal, the method comprising:

detecting, via a biometric sensor of the terminal, a biometric signal of a user wearing the watch type terminal;

determining, via a controller of the terminal, target biometric data for the user to be collected based on the detected biometric signal;

detecting, via the biometric sensor, additional biometric signals of the user to collect the target biometric data;

outputting the target biometric data to the user;

detecting, via the biometric sensor, the biometric signal at a first period; and detecting, via the biometric sensor, the additional biometric signals for collecting the target biometric data at each second period shorter than the first period.

* * * * *